United States Patent
Werner et al.

(10) Patent No.: US 10,917,274 B2
(45) Date of Patent: Feb. 9, 2021

(54) TRANSMITTING RADIO EQUIPMENT, RECEIVING RADIO EQUIPMENT AND CORRESPONDING METHODS FOR COMMUNICATING USING A REFERENCE SIGNAL

(71) Applicant: Telefonaktiebolaget LM Ericsson (publ), Stockholm (SE)

(72) Inventors: Karl Werner, Segeltorp (SE); Robert Baldemair, Solna (SE); Håkan Björkegren, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/320,333

(22) PCT Filed: Jul. 26, 2016

(86) PCT No.: PCT/SE2016/050729
§ 371 (c)(1),
(2) Date: Jan. 24, 2019

(87) PCT Pub. No.: WO2018/021951
PCT Pub. Date: Feb. 1, 2018

(65) Prior Publication Data
US 2019/0280909 A1    Sep. 12, 2019

(51) Int. Cl.
*H04L 27/26* (2006.01)
*H04L 5/00* (2006.01)
*H04W 56/00* (2009.01)

(52) U.S. Cl.
CPC ........ *H04L 27/2613* (2013.01); *H04L 5/0023* (2013.01); *H04L 5/0051* (2013.01);
(Continued)

(58) Field of Classification Search
CPC ... H04L 5/0023; H04L 5/0051; H04L 5/0094; H04L 27/2613; H04L 27/26; H04L 27/2666; H04W 56/001
See application file for complete search history.

(56) References Cited

U.S. PATENT DOCUMENTS

2014/0247778 A1* 9/2014 Gomadam ............ H04L 5/0051
370/329
2015/0195063 A1* 7/2015 Ro ........................ H04L 5/0042
370/329
(Continued)

FOREIGN PATENT DOCUMENTS

WO    2015057156 A2    4/2015

OTHER PUBLICATIONS

R1-164032; "Discussion on frame structure for NR"; Huawei et al.; May 23-27, 2016 (Year: 2016).*
(Continued)

*Primary Examiner* — Benjamin H Elliott, IV
(74) *Attorney, Agent, or Firm* — Christopher & Weisberg, P.A.

(57) ABSTRACT

Methods and transmitting and receiving radio equipments for transmitting and receiving a reference signal in a subframe where a portion of one or more multi-carrier modulation symbols that is included in the subframe is used for transmitting control information to receiving radio equipments. The transmitting radio equipment transmits the reference signal overlaid on at least a part of the portion of the one or more multi-carrier modulation symbols that is used for transmitting the control information in the subframe. The reference signal is generated based on at least one parameter. The receiving radio equipment then receives a transmission including the control information and the reference signal in the subframe, and may determine one or more properties of the reference signal based on the at least one parameter and
(Continued)

process the reference signal using the determined one or more properties of the reference signal.

21 Claims, 13 Drawing Sheets

(52) U.S. Cl.
CPC ............ *H04L 5/0094* (2013.01); *H04L 27/26* (2013.01); *H04L 27/2666* (2013.01); *H04W 56/001* (2013.01)

(56) References Cited

U.S. PATENT DOCUMENTS

| | | | |
|---|---|---|---|
| 2017/0374638 A1* | 12/2017 | Han | G01S 5/0036 |
| 2018/0042000 A1* | 2/2018 | Zhang | H04W 72/042 |
| 2018/0054821 A1* | 2/2018 | Sun | H04W 16/14 |
| 2018/0084593 A1* | 3/2018 | Chen | H04L 27/2613 |
| 2018/0219606 A1* | 8/2018 | Ng | H04B 7/0695 |
| 2018/0249400 A1* | 8/2018 | Harada | H04W 48/18 |
| 2018/0352540 A1* | 12/2018 | Lee | H04L 5/0048 |
| 2019/0280909 A1* | 9/2019 | Werner | H04L 27/2613 |
| 2019/0288809 A1* | 9/2019 | Iyer | H04L 1/1893 |

OTHER PUBLICATIONS

R1-164046; "Forward compatibility consideration on reference signals and control information/channels"; Huawei; May 23-27, 2016 (Year: 2016).*

R1-164248; "NR Frame Structure Design"; CATT; May 23-27, 2016 (Year: 2016).*

Intel Corporation: R1-120611; Frequency and Time synchronization aspects of additional carrier type; 3GPP Draft; CA New Carrier Synchronization, 3rd Generation Partnership Project (3GPP), Mobile Competence Centre; 650, Route Des Lucioles ; F-06921 Sophia-Antipolis Cedex, France,vol. RAN WG1, Dresden, Germany—Feb. 10, 2012; Consisting of 6 pages.

Samsung: R1-163995 ;Discussions on reference signal design for NR', 3GPP Draft; RS Design, 3rd Generation Partnership Project (3GPP), Mobile Competence Centre; 650, Route Des Lucioles; F-06921 Sophia-Antipolis Cedex; France; Nanjing, China; May 13, 2016 (May 13, 2016); Consisting of 4 pages.

Samsung: R1-164014 Discussion on RS for Beam Formed Access, 3rd Generation Partnership Project (3GPP), Mobile Competence Centre ; 650, Route Des Lucioles ; F-06921 Sophia-Antipolis Cedex; France vol. RAN WG1, No. Nanjing, China; May 23, 2016-May 27, 2016 May 13, 2016 (May 13, 2016); Consisting of 3 pages.

Ericsson: RI-164628; Frame structure for NR , 1,7 ,12, 3GPP Draft; 3rd Generation 18,24, Partnership Project (3GPP), Mobile 26,38, Competence Centre ,. 650, Route Des 44,49, Iucioies; F-06921 Sophia-Antipolis Cedex ,France,vol. RAN WG1, No. Nanjing, China; May 13, 2016 (May 13, 2016); Consisting of 3 pages.

Sony: RI-164657; Discussion on frame structure design for NR, GPP Draft; 3 3rd Generation Partnership Project (3GPP), Mobile Competence Centre ; 650, Route Des Lucioles ; F-06921 Sophia-Antipolis Cedex France, vol. RAN WG1, No. Nanjing, China May 23-27, 2016; Consisting of 6 pages.

International Search Report dated Jul. 4, 2017, for corresponding International Application No. PCT/EP2016/050729; International Filing Date: Jul. 26, 2016; consisting of 6-pages.

* cited by examiner

TRANSMITTING RADIO EQUIPMENT, RECEIVING RADIO EQUIPMENT AND CORRESPONDING METHODS FOR COMMUNICATING USING A REFERENCE SIGNAL

CROSS-REFERENCE TO RELATED APPLICATIONS

This application is a Submission Under 35 U.S.C. § 371 for U.S. National Stage Patent Application of International Application Number: PCT/SE2016/050729, filed Jul. 26, 2016 entitled "TRANSMITTING RADIO EQUIPMENT, RECEIVING RADIO EQUIPMENT AND CORRESPONDING METHODS FOR COMMUNICATING USING A REFERENCE SIGNAL," the entirety of which is incorporated herein by reference.

TECHNICAL FIELD

The embodiments described herein relate generally to a transmitting radio equipment and a receiving radio equipment in a communications network and to methods performed in the transmitting radio equipment and the receiving radio equipment. In particular embodiments herein relate to use of a reference signal in communication between the transmitting radio equipment and the receiving radio equipment.

BACKGROUND

Different types of radio networks have been developed to provide radio communication for various wireless devices in different areas which are typically divided into cells or similar. The radio networks, also commonly referred to as wireless, cellular or mobile communication networks, are constantly improved to provide better capacity, quality and coverage to meet the demands from subscribers using services and increasingly advanced terminals for communication, such as smartphones and tablets, which often require considerable amount of bandwidth and resources for data transport in the networks. Therefore, it is often a challenge to achieve high capacity and good performance, e.g. in terms of high data throughput, low latency and low rate of dropped calls or lost data, in the radio communication between network nodes in the radio network and various wireless devices communicating with the network nodes.

In the field of mobile or wireless communication, the term wireless device is often used to represent any communication entity capable of radio communication with a radio network by sending and receiving radio signals, such as e.g. mobile telephones or terminals, tablets and laptop computers. Another common term in this field is User Equipment (UE) which thus corresponds to a wireless device. A wireless device in this context could also be a machine-to-machine type of device operating automatically such as a sensor, counter or measuring entity which is configured to send reports over the radio network e.g. at certain intervals or upon certain events. Further, the term network node is often used in the field of mobile or wireless communication to represent any node of a radio network that is arranged to communicate radio signals with wireless devices. The network node in this context is often also referred to as a base station, a radio node, an eNodeB, an eNB, a base transceiver station, a remote radio unit (RRU), an access point, a transmission point controlled a base station, etc. In this disclosure any such communication entity or node may when appropriate be commonly referred to as radio equipment, which depending on the direction of communication may be referred to as transmitting radio equipment or receiving radio equipment. In particular, the term transmitting radio equipment is used herein to denote a radio equipment that transmits reference signals intended to be used for acquiring synchronization to a wireless communication network whereas the term receiving radio equipment is used to denote radio equipment that uses the reference signals for acquiring synchronization to the wireless communication network.

In order to improve capacity and performance in the radio communications network, various features can be employed that are intended to make the radio communication more efficient in terms of resource usage. In particular, it is desirable to reduce energy consumption in the network as well as the amount of interference generated by transmissions made by network nodes and wireless devices, which in turn could improve both capacity and performance. It is for example desirable to limit the transmission of reference signals, such as the cell-specific reference signal (CRS) used by wireless devices being connected to a Long Term Evolution (LTE) communications network.

To be able to communicate with a communications network, a radio equipment, such as a wireless device, needs to acquire time synchronization, denoted time synch for short herein. Examples of such a communications network is the LTE network or a so called 5G network, also denoted New Radio Access Technology (NR) network, which is currently being under discussion in a forum known as the Third Generation Partnership Project (3GPP).

In LTE, so far, time synchronization is obtained in two steps. In the first step, the radio equipment or wireless device acquires coarse time synchronization by listening for primary and secondary synchronization signals of a cell served by a network node while being in the coverage area of the cell. In the second step, the radio equipment or wireless device acquires fine time synchronization by listening to CRS transmitted by the network node at regular intervals in the whole coverage area of the cell.

In an NR network, time synchronization will likely be obtained in multiple steps. In the first step, the radio equipment or wireless device will acquire coarse, i.e. less accurate, time synchronization by listening for a synchronization signal (SS) that is associated with an access parameter configuration obtained from an Access Information Table (AIT) that may be broadcasted in the 5G or NR network across different areas e.g. defined by one or more cells, sectors or antenna beams. In order to enable any type of radio equipment, i.e. both narrowband and wideband radio equipment, to synchronize to the network using the SS, it should be a narrowband signal. To improve the coarse synch further synchronization signals are also envisioned. In any case, the radio equipment or wireless device will after having acquired coarse synch acquire fine, i.e. more accurate, time synchronization in a following step.

The coarse time synch enables the radio equipment or wireless device to find the start of the downlink transmission frame and also rough Orthogonal Frequency Division Multiplexing (OFDM) symbol starting points in time. This enables decoding of control information, system information etc. This information is typically transmitted using robust modulation schemes and is normally quite robust to timing errors—hence the coarse synchronization obtained in the first step is sufficient for this purpose. The fine time synchronization allows the radio equipment or wireless device to obtain accurate channel estimates needed for demodulation and to decode data that is encoded using higher order modulation.

The synchronization accuracy is bounded by the bandwidth of the signal used for synchronization. Simplified, it can be argued the accuracy in the time synch cannot be better than 1/B, where B is the bandwidth of the synch signal. In other words, there is an inverse relationship between the bandwidth of the signal on which synchronization is obtained and the accuracy of the resulting timing estimation. Thus the bandwidth of the synchronization signal should be increased in the step following upon the first step to increase the accuracy. In LTE this is achieved by the CRS which spans the complete bandwidth of the carrier while the primary synch and secondary synch only have a BW of about 1 MHz. For the highly accurate time synchronization required in the following step mentioned above, wideband reference signals, having a bandwidth as large, or almost as large, as the full system bandwidth, may be needed. For the coarse time synch, as indicated above, more narrowband signals may suffice.

In NR, demands for ultra-lean design, flexibility, and forward compatibility put restrictions on the use of radio resources for synchronization. After having acquired SS and AIT, the wireless devices or radio equipments will base synchronization, channel estimation, etc, only on on-demand, scheduled signals; a radio equipment such as a wireless device is not allowed to make any assumption on signals being present in a subframe unless it is scheduled in that subframe. Hence NR will not have reference signals comparable to the CRS and other solutions are needed to provide accurate fine time synchronization in an NR network. One solution for time synchronization would be to introduce reference signals similar to the CRS into NR, but that would mean that a substantial amount of radio resources will be reserved for synchronization, which would hamper the network efficiency.

SUMMARY

It is an object of embodiments described herein to address at least some of the problems and issues outlined above. More particularly it is an object to provide a mechanism that is self-contained in a subframe for obtaining fine time synchronization needed at a receiving radio equipment for receiving and transmitting data in communication with a communications network. Further objects are to provide a reference signal useful for positioning measurements and/or for power measurements in the subframe. It is possible to achieve these objects and others by using a first radio equipment, also denoted transmitting radio equipment, a second radio equipment, also denoted receiving radio equipment, and methods therein, as defined in the attached independent claims.

According to a first aspect, the objects are achieved by a method of transmitting a reference signal performed by a transmitting radio equipment of a communications network. The reference signal is transmitted in a subframe where a portion of one or more multi-carrier modulation symbols that are comprised in the subframe is used for transmitting control information.

In the method the transmitting radio equipment transmits the reference signal overlaid on at least a part of the portion of the one or more multi-carrier modulation symbols that is used for transmitting the control information in the subframe. The reference signal is intended for use by at least one receiving radio equipment and the reference signal is generated based on at least one parameter that enables the at least one receiving radio equipment to determine one or more properties of the transmitted reference signal.

According to a second aspect, the objects are achieved by a method of receiving a reference signal performed by a receiving radio equipment of a communications network. The reference signal is transmitted by a transmitting radio equipment in a subframe where a portion of one or more multi-carrier modulation symbols that are comprised in the subframe is used for transmitting control information.

In the method the receiving radio equipment receives a transmission in the subframe. The transmission comprises the control information and the reference signal, and the reference signal is overlaid on at least a part of the portion of the one or more multi-carrier modulation symbols that is used for transmitting the control information. The receiving radio equipment then determines one or more properties of the reference signal based on at least one parameter and processes the reference signal using the determined one or more properties of the reference signal.

According to a third aspect, the objects are achieved by a first radio equipment for transmitting a reference signal. The first radio equipment is configured to transmit the reference signal in a subframe comprising one or more multi-carrier modulation symbols. A portion of the one or more multi-carrier modulation symbols in the subframe is used for transmitting control information. The first radio equipment is, more particularly, configured to transmit the reference signal overlaid on at least a part of the portion of the one or more multi-carrier modulation symbols that is used for transmitting the control information in the subframe. The reference signal is intended for use by at least one receiving radio equipment and the reference signal is generated based on at least one parameter that enables the at least one receiving radio equipment to determine one or more properties of the transmitted reference signal.

According to a fourth aspect, the objects are achieved by a second radio equipment for receiving a reference signal. The reference signal is transmitted by a transmitting radio equipment in a subframe comprising one or more multi-carrier modulation symbols. A portion of the one or more multi-carrier modulation symbols in the subframe is used for transmitting control information. The second radio equipment is configured to receive a transmission comprising the control information and the reference signal in the subframe. The reference signal is overlaid on at least a part of the portion of the one or more multi-carrier modulation symbols that is used for transmitting the control information. The second radio equipment is configured to determine one or more properties of the reference signal based on at least one parameter and to process the reference signal using the determined one or more properties of the reference signal.

The above transmitting radio equipment, receiving radio equipment, and methods therein may be configured and implemented according to different optional embodiments to accomplish further features and benefits, to be described below.

A computer program is also provided comprising instructions which, when executed on at least one processor, cause the at least one processor to carry out any one of the above methods according to the first and second aspects. A carrier is also provided which contains the above computer program, wherein the carrier is one of an electronic signal, optical signal, radio signal, or a computer readable storage medium.

By transmitting the reference signal, that is generated based on at least one parameter, overlaid on at least a part of the portion of the one or more multi-carrier modulation symbol that is used for transmission of control information in the subframe, the reference signal can be received by the receiving radio equipment together with the control information, one or more properties of the reference signal can be determined by the receiving radio equipment based on at least one parameter and the reference signal can be processed by the receiving radio equipment using the determined one or more properties of the reference signal.

The processing of the reference signal may comprise obtaining a fine time synchronization for data reception or transmission, obtaining parameters for computing a channel estimate, using the reference signal in measurements for positioning, e.g. as a timing reference, and/or using the reference signal for power measurements. The at least one parameter, from which the one or more properties may be determined, may be pre-configured in the receiving radio equipment and/or indicated by the control information. Since the control information is generally transmitted using a robust modulation and coding scheme, the overlaying of the reference signal can be made without risking that the control information cannot be correctly received.

BRIEF DESCRIPTION OF DRAWINGS

The solution will now be described in more detail by means of exemplary embodiments and with reference to the accompanying drawings, in which.

DETAILED DESCRIPTION

Embodiments herein relate to wireless communication networks where demands for ultra-lean design, flexibility, and forward compatibility put restrictions on the use of radio resources for synchronization. The wireless communication network is assumed to use any type of multi-carrier modulation technique.

In future implementations of such wireless communication networks, the coverage area of a cell of a network node is expected to be more dynamic, e.g. due to the introduction of advanced beam forming solutions. That is, a predefined coverage area of a transmitting radio equipment such as a base station, i.e. what today is known as a cell, will not be continuously covered anymore. Instead coverage is expected to be provided where needed in a coverable area. To be able to communicate within, or via, such a network, receiving radio equipments such as wireless devices must acquire synchronization and a set of access parameters. The set of access parameters may be derivable from an access information table (AIT) that may be broadcasted within the whole coverable area, or otherwise made known to the receiving radio equipment or wireless device. To derive the set of access parameters valid for a coverage area, within the coverable area, where the receiving radio equipment or wireless device is currently located, the receiving radio equipment or wireless device may use a synchronization signal (SS) broadcasted within the coverage area where the receiving radio equipment or wireless device is currently located. The SS is a narrowband signal that can be received by various receiving radio equipment having different bandwidth capability. The SS provides a first, coarse synchronization, in time and frequency, that enables the receiving radio equipment or wireless device to find a start of a downlink transmission frame and to determine rough multi-carrier modulation symbol starting points in time. After having obtained the first coarse synchronization the receiving radio equipment or wireless device is in principle expected to base synchronization, channel estimation, etc, only on on-demand, scheduled signals such as demodulation reference signals (DMRS), used for channel estimation, and mobility reference signals (MRS), used e.g. for mobility measurements.

Figure 1:
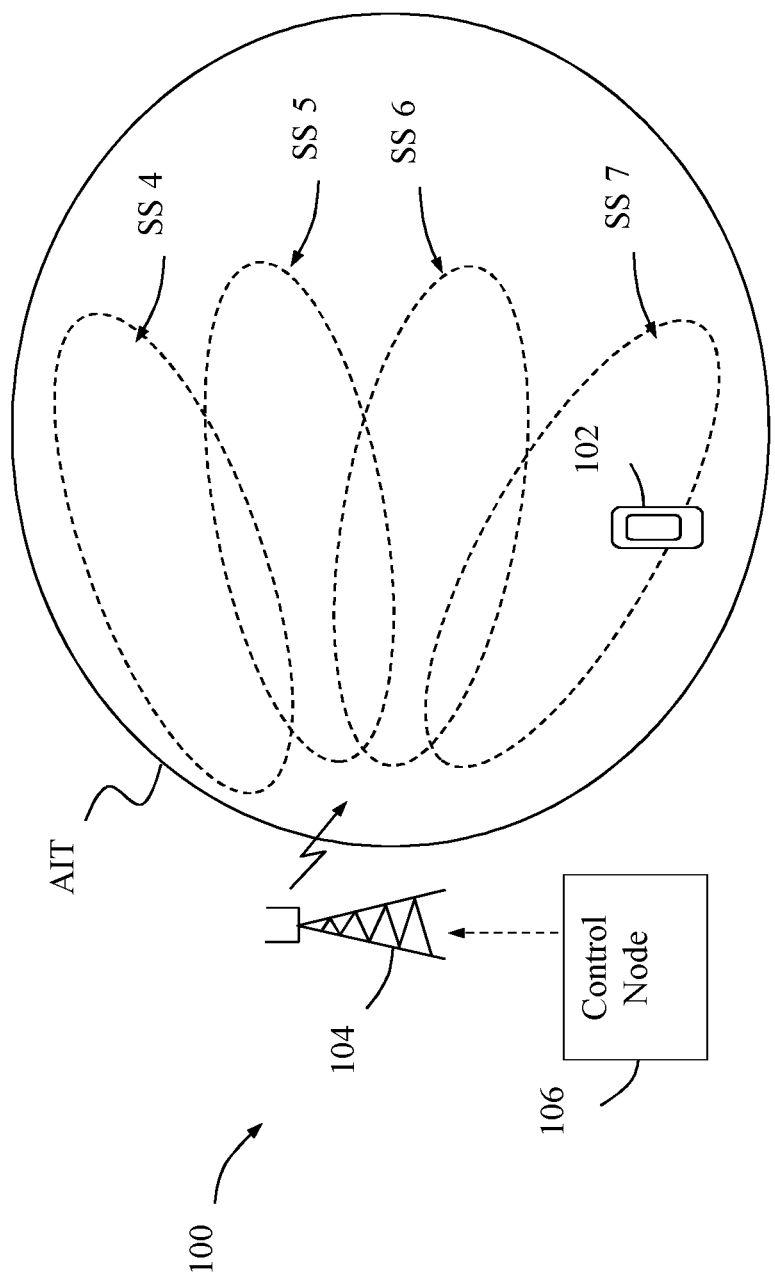
FIG. 1 illustrates a communication scenario where different synchronization signals are broadcasted over different areas within a large coverage area.

The 5G or NR network currently being discussed in 3GPP is an example of a wireless communication network having the above-described demands on ultra-lean design, flexibility, and forward compatibility that put restrictions on use of radio resources for synchronization. FIG. 1 illustrates a communication scenario in such a 5G or NR network 100 comprising at least one transmitting radio equipment 104, which may for example be one or more base stations, and a control node 106 that controls the at least one transmitting radio equipment 104 to broadcast access information and transmit synchronization signals as follows.

The at least one transmitting radio equipment 104 broadcasts the AIT comprising sets of access parameter configurations over a relatively wide area. The at least one transmitting radio equipment 104 may also transmit different synchronization signals (SS) over smaller sectors or antenna beams within the wide area, namely the signals indicated by SS 4, SS 5, SS 6 and SS 7, as shown in the figure. Alternatively or additionally, the different synchronization signals may be transmitted by one or more other transmitting radio equipment that may also be controlled by the control node 106.

The received synchronization signal (SS) may in this example be one of SS 4-7 shown in FIG. 1. For example, a receiving radio equipment or wireless device 102 that receives the synchronization signal corresponding to SS 7 is thus able to derive an access parameter configuration with valid access parameters therefrom. To derive the access parameter configuration from the AIT and the received SS, a predefined mapping that is known in advance to the receiving radio equipment or wireless device, e.g. by being pre-configured or broadcasted, may be used. This access parameter configuration and its parameter settings can then be used by the receiving radio equipment or wireless device for accessing the radio network. However, to be able to also receive and transmit data that is encoded using higher order modulation and to obtain accurate channel estimates for demodulation, a refined, more accurate synchronization needs to be acquired by the receiving radio equipment or wireless device.

As previously discussed, new solutions for fine time synchronization are needed in wireless communication networks such as the 5G or NR network. In the following, requirements on such a solution for fine time synchronization will be discussed, and a solution according to embodiments of the invention will be presented, in the context of a 5G or NR network using OFDM as multi-carrier modulation technique.

Similarly to what applies for LTE, where OFDM is used as modulation technique in the downlink, the physical resource of the 5G or NR network may likely be modeled as a time-frequency grid where each resource element (RE) corresponds to one OFDM subcarrier during one OFDM symbol interval. The subcarriers may be assumed to span the system bandwidth in the frequency domain and transmissions may be assumed to be made in subframes spanning a number of OFDM symbols.

In order to keep the principle of self-contained subframes which is intended to be applied for NR, fine time synchronization should ideally be based on a signal transmitted in the same subframe as the data that is to be decoded using the fine time synch.

To achieve this, one solution could be to base fine time synchronization on the same reference signals as demodulation is based on. i.e. on Demodulation Reference Signals (DMRS). This however has the following problems:
  Fine time synchronization will not be available before receiving the data block, as the DMRS are contained in the data block.
  The bandwidth spanned by the DMRS is limited by the bandwidth of the data. This limits synchronization accuracy.
  Channel estimation based on DMRS benefits from accurate time synch—hence synch should ideally be available before processing DMRS. This is especially true with the proposed DMRS pattern defined for NR in which orthogonal cover codes (OCC) across frequency are used for separating layers. Using the OCC "across frequency" means that the OCC sequence is mapped to different resource elements, i.e. different subcarriers, in the same OFDM symbol.

A second solution could be to schedule a separate, potentially wideband, signal for fine time synchronization together with the data. This is a viable option but has the following problems:

If scheduled on dedicated resources, e.g. specific resource elements, in the same Downlink Control Information (DCI) as the data to be received, or in another DCI transmitted in the same subframe as the data to be received, the signal can, at the earliest, occur in the first OFDM symbol that contains data. Hence fine time synch would not be available in time.
  If scheduled in a DCI transmitted in an earlier subframe, the signal used for fine time synchronization may occur in a preceding subframe. This would solve the problem above but it would create dependencies across subframes, i.e. the principle of self-contained subframes would not be kept as desired.
  If the signal occupies a different orthogonal resource, i.e. a different subcarrier in a multi-carrier system, compared to the data targeting the same terminal or wireless device, other data blocks need to take the signal into account—this results in complicated cross-dependency between resources allocated to different transmissions, meaning that one user cannot determine which resources to use without taking into account the allocation of resources intended for other users.

Another solution could be to reserve resource elements in the OFDM symbols that carry the control channel. This has the following problems:
  The resource elements occupied by the synchronization signal need to be pre-configured—as they cannot be used by the control channels. Hence scheduling flexibility is lost—and the principle of self-contained subframes is not preserved.
  As the fine time synchronization signal needs to have wide bandwidth, it would typically need to be wider in bandwidth than a single localized control message—hence its presence may affect several control messages. The resulting dependency across control channel search spaces further complicates scheduling and requires pre-configuration.

In summary, a solution for fine time synchronization is desired, which enables a subframe to be self-contained in that:
  The signal used for acquiring fine time synchronization should be scheduled in the same subframe as the scheduling information relating to the transmission for which fine time synchronization is needed.
  The signal used for acquiring fine time synchronization should be configured per user, i.e. per receiving radio equipment or wireless device, to make sure that it fits the capabilities, e.g. in terms of bandwidth or depending on modulation and coding scheme (MCS) used, of the receiving radio equipment or wireless device.
  The signal used for acquiring fine time synchronization should not interfere with signals scheduled for other users.
  The signal used for acquiring fine time synchronization should be configured to avoid interference from other cells or sectors.

To meet these requirements, a solution is provided where a reference signal used for fine time synchronization is multiplexed with the physical control channel in a subframe in a way that allows for the physical control channel to be detected without knowledge of the reference signal. Then the reference signal parameters may be obtained from the physical control channel without dependency across subframes. Since the design of the reference signal allows the network to determine beamforming weights of the reference signal independently of the control channel, the reference signal may be configured to avoid interference from other cells or sectors. The design allows the reference signal to be transmitted to a single receiving radio equipment or to a group of receiving radio equipments.

According to the solution a reference signal, also denoted overlaid synchronization signal (OSS) in the following, is superimposed on top of all or a subset of the OFDM symbols that carry the physical control channel (PCCH), in the following also denoted control channel. The OSS can have significantly lower power spectral density (PSD) compared to the PCCH and may occupy the same resource elements as is used by the PCCH, and possibly also further resource elements that are not used by the PCCH. The signal may be more wideband than the PCCH and may span several PCCH—also PCCHs that are intended for users, or receiving radio equipment, not configured to receive the OSS. The parameters, e.g. presence, sequence, bandwidth, etc—representing properties of the OSS, may be signaled or indicated on the DCI carried by the PCCH in the very same subframe where the reference signal or OSS is transmitted. Alternatively the solution may be based on blind detection of the OSS, in order to avoid DCI signaling.

The receiving radio equipment, also denoted terminal or wireless device herein, can decode the PCCH without knowledge of the OSS. After obtaining the DCI, the OSS parameters may be obtained, and the OSS may be used for fine time synchronization in order to support subsequent demodulation of a physical data channel (PDCH), in the following also denoted data channel, associated with the decoded PCCH.

Figure 2:
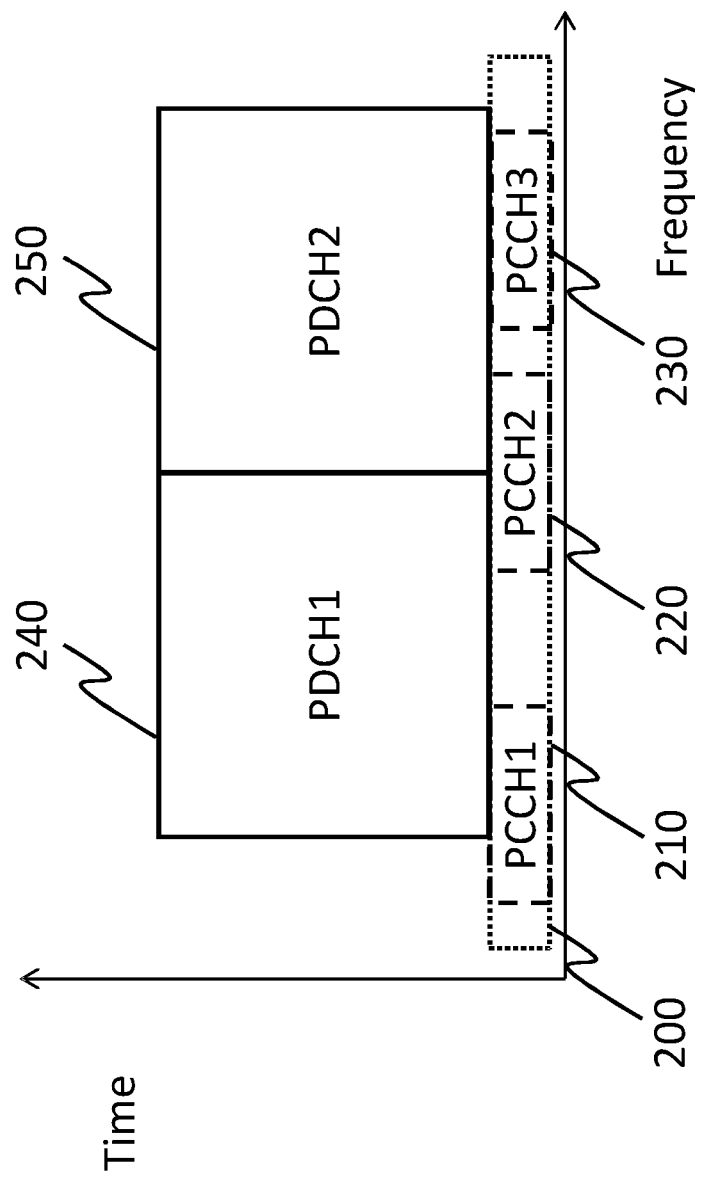
FIG. 2 is a schematic diagram illustrating mapping of a reference signal in a subframe, according to some possible embodiments.

In FIG. 2 a schematic diagram of mapping of a reference signal 200, for example denoted OSS1, in a subframe is provided. The reference signal 200 may be a wideband reference signal spanning essentially the full system bandwidth in the frequency dimension and one or more multi-carrier modulation symbols, e.g. one or more OFDM symbols, in the time dimension. The reference signal 200 may be contiguous or intermittently distributed, e.g. with some periodicity, over the system bandwidth. It is assumed that the control channel of a user 1, PCCH1 210 contains the DCI that schedules data channel PDCH1 240 for user 1 etc. Parameters of OSS1 are signaled on PCCH for the users for which OSS1 applies or is intended. The parameters may for example be signaled on PCCH1 if OSS1 may be used to demodulate and/or decode PDCH1. Parameters of OSS1 may also be transmitted on PCCH2 220 if the same reference signal 200, i.e. OSS1, may be used to demodulate and/or decode PDCH2 250. PCCH1 210, PCCH2 220 and PCCH3 230 may all be decoded without knowing the parameters of OSS1, or the presence of OSS1. Whether or not the users targeted by the different PCCHs should use the OSS1 would typically be indicated in the respective PCCH. As mentioned above, the reference signal, in this example OSS1, may span also PCCHs that are intended for users, or receiving radio equipment, not configured to use the OSS1. In other words, the reference signal may be overlaid also on such portions of the multicarrier modulation symbols that are used for transmitting PCCHs that do not indicate that the reference signal should be used. In the example of FIG. 2, PCCH3 may be one such control channel. It is however also possible that PCCH3 indicates that the reference signal, OSS1, should be used, but not for obtaining time synchronization for reception and/or demodulation of a data channel, i.e. PDCH, in the subframe. For example, PCCH3 could comprise a scheduling grant for an uplink data transmission in another (later) subframe, and indicate that the reference signal 200, i.e. OSS1, should be used for obtaining a timing reference for timing advance purposes for the uplink data transmission.

The OSS may be shared among several terminals or wireless devices. Whether or not the OSS is shared in this way is network controlled and transparent to each terminal or wireless device. Several OSS may be transmitted in the same multi-carrier modulation symbol, on overlapping or non-overlapping resources, e.g. in form of time-frequency resources or resource elements (REs).

Figure 3:
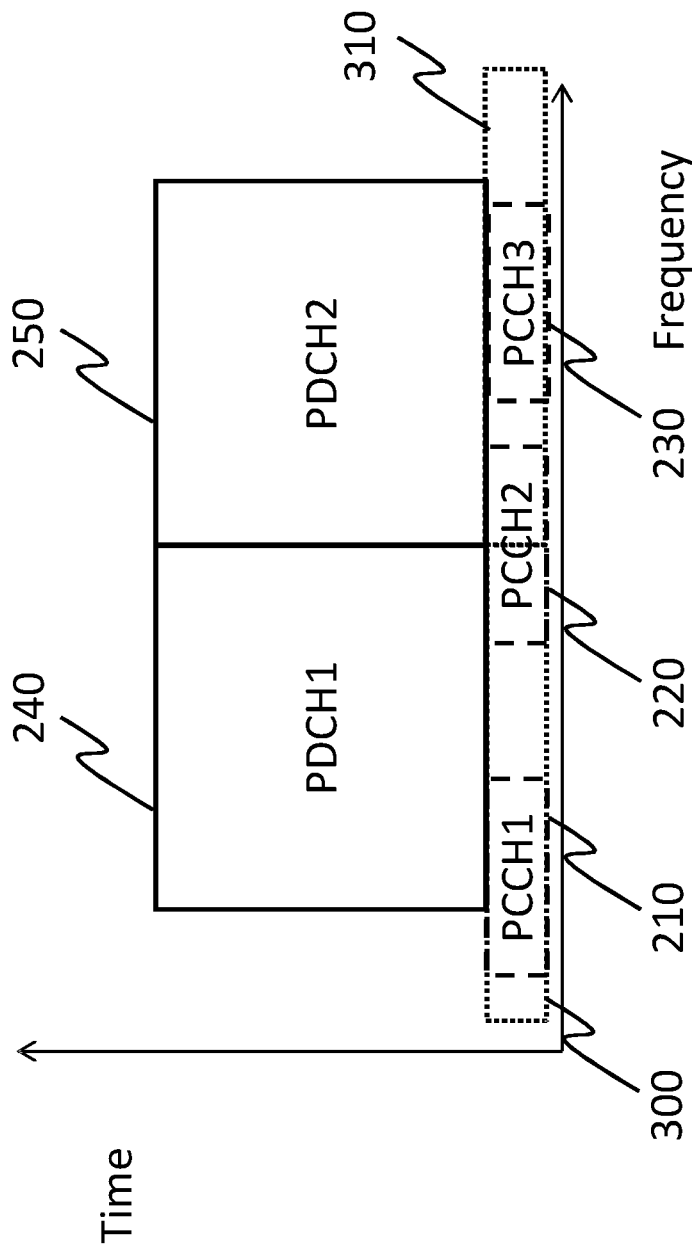
FIG. 3 is a schematic diagram illustrating mapping of a reference signal in a subframe, according to further possible embodiments.

This is illustrated in FIG. 3 where another schematic diagram of a mapping of two reference signals 300 and 310, for example denoted OSS1 and OSS2, in a subframe, is provided. The two different reference signals 300 and 310 are transmitted in the same time interval, in the same one or more multi-carrier modulation symbols, e.g. one or more OFDM symbols. In this example, the system bandwidth is divided in two parts; so that OSS1 is transmitted in the lower part of the frequency band and OSS2 is transmitted in the upper part of the frequency band. It is however also possible to e.g. multiplex the two reference signals 300 and 310 so that they both may span a wider part of the system bandwidth or the full system bandwidth, e.g. if a higher accuracy in time synch is needed. As explained in the example of FIG. 2 above, the control channel of a user 1, PCCH1 210 contains the DCI that schedules data channel PDCH1 240 for user 1 etc. Parameters of OSS1, OSS2 are signaled on PCCH. The parameters of OSS1 may for example be signaled on PCCH1 210 if OSS1 may be used to demodulate and/or decode PDCH1 240 and the parameters of OSS2 may be signaled on PCCH2 220 if OSS2 may be used to demodulate and/or decode PDCH2 250. PCCH1 210, PCCH2 220 and PCCH3 230 may all be decoded without knowing the parameters of OSS1, or OSS2, or the presence of OSS1 or OSS2. PCCH3 may or may not indicate that OSS1 or OSS2 should be used, in analogy with the discussion in relation to FIG. 2 above.

Advantages of the provided solution include:

1) The control channel is typically robust and its decoding performance will not significantly be affected by the much weaker overlaid signal.

2) The receiving radio equipments do not need to be pre-configured with the parameters of the OSS in order to be able to decode the PCCH. Not even the presence of the OSS need to be known to the terminal or wireless device on beforehand. The self-contained principle is preserved for the subframes.

3) The bandwidth of the OSS is not limited to the bandwidth of neither the PCCH nor the data channel. Hence estimation accuracy may be ensured. The power spectral density (PSD) of the OSS is low, but given the wide bandwidth and the nature of time synchronization, meaning that time synchronization may usually be acquired even at very low SNR—sufficient accuracy is still obtained.

4) The network is in full control of how and when to transmit the OSS, e.g. from which transmitting radio equipment, also denoted transmission node or base station herein, with which power, on which band etc. It may choose to transmit OSS from the same transmission node or base station as the corresponding data, i.e. the data for which reception requires the fine time synchronization—with the same beamformer. The transmission node and beamformer of the OSS does not need to coincide with the transmission node of the PCCH, as long as the transmission node that transmits the OSS and the transmission node that transmits the PDCH have roughly the same sync, i.e. the transmission nodes should at least be quasi co-located, in particular with respect to (w.r.t.) time, to ensure that the receiving radio equipment can derive time synchronization, and other parameters relevant for decoding of PDCH by using OSS. Quasi co-location of transmission nodes, or antenna ports, is a concept that defines what type of parameters can be estimated for one transmission node or antenna port and taken to be valid for the other, quasi co-located transmission node or antenna port. If time synchronization obtained from a transmission from one transmission node, or antenna port, is to be used for processing a transmission from another transmission node, or antenna port, the transmission nodes, or antenna ports, should be quasi co-located at least w.r.t. time. Further details regarding the term quasi co-located used herein can be found in 3GPP specifications where the concept of quasi co-location has been specified.

5) The OSS may be transmitted in the same subframe as the data—so scheduling flexibility is retained.

The impact and operation of the proposed solution may differ depending on signal-to-noise ratio (SNR) as measured by the receiving radio equipment, e.g. terminal or wireless device, on the control channel and data channel.

At high SNR:
Control channel transmission format is more robust than data channel transmission format. Due to this, the overlaid OSS has no appreciable effect on the decoding of the PCCH. To exemplify: if the OSS has a power spectral density of −5 dB relative to the data, then effective control channel SNR would be 5 dB, even if actual SNR due to geometry and noise is much higher. But as the control channel is typically designed for operation at very low SNR, it will be virtually error free at 5 dB.
Time synchronization accuracy is more critical, as High Order Modulation (HOM) is used—the need for OSS is large.

At low SNR:
Control channel SNR is dominated by noise contribution—the overlaid OSS has a small effect on PCCH performance. To exemplify: with OSS at −5 dB PSD relative to the control channel, at −5 dB SNR, the additional interference due to OSS will be −10 dB below the actual interference level.
High order modulation (HOM) is not used for data—so the network (NW) may choose to not, e.g. if not otherwise needed, transmit OSS. As terminals or wireless devices are only expected to receive OSS if indicated in the same DCI, omit transmitting OSS will not destroy receiver performance, as terminals or wireless devices will only assume that the OSS is present if its presence is indicated in the PCCH. If OSS is not transmitted, the network will not indicate its presence in PCCH.
At very low SNR OSS may not be detectable, but as HOM is not used at low SNR, OSS may not be needed.
If OSS is not present, or present but not intended for the terminal or wireless device, the receiving radio equipment, e.g. terminal or wireless device, will be aware of this as no OSS is indicated in DCI and may take appropriate action. Such action may be to use the rough, or coarse, synch which may be sufficient depending on operation. In the event that rough synch is not sufficient, such action may include reusing last fine time synch, or adjusting receiver filters to take timing uncertainty into account.

The proposed OSS may be used for fine time synchronization, but also other parameters related to the associated data transmission may be estimated using the OSS. These include:

Delay spread, power delay profile and similar parameters used for channel estimation.
Pathloss and related parameters used for, e.g, Automatic Gain Control (AGC) state setting in the receiving radio equipment.

A basic overview of the provided mechanism for enabling a refined synchronization has been given above. Details of important aspects of the solution are given below. For simplicity these aspects are discussed for a scenario where the mechanism is applied to receptions of downlink transmissions. It is easily generalized to other link types or link directions as well. One such example could be obtaining timing for uplink transmissions.

Signal Design

The reference signal or OSS needs to have good aperiodic autocorrelation function (ACF) properties in order to allow for accurate time synchronization. One option would be to use a signal design similar to that of a Zadoff-Chu sequence, which is a sequence used for the Primary Synchronization Signal (PSS) in the Long Term Evolution (LTE) standard. Other possibilities with good a-periodic ACF properties are Golay sequences, Walsh sequences, Bark sequences, Gold codes, etc.

The reference signal or OSS needs to be dense enough, in terms of fraction of subcarriers occupied, to enable good estimation performance, and in order to allow enough energy to be allocated to the signal even though PSD is low. A too sparse signal, in terms of fraction of subcarriers occupied, leads to aliasing, which is detrimental to estimation performance. The reference signal needs to be wideband enough to provide the required synchronization accuracy.

Allocation of OSS in Resource Grid, Power Allocation and Supposition with PCCH

OSS power spectral density (PSD) should be such that the presence of the OSS does not substantially affect decoding performance of the PCCH. This means that the ratio of the PSD of OSS to that of PCCH should be low. A ratio on the order of −5 to −10 dB may be a reasonable choice. The higher the bandwidth of the OSS the lower can the PSD of the OSS be while still retaining enough performance.

There is a connection between bandwidth of the OSS and the synchronization accuracy that can be obtained. The required synchronization accuracy depends, for example, on the modulation parameters and the bandwidth of the data transmission. There is typically no strong relationship between the bandwidth required for the OSS and the bandwidth of the PCCH that schedules the OSS and the corresponding data. The allocation of the OSS on the resource grid may overlap with one or more control channels, i.e. one or more PCCHs. There is no need to take the allocation of OSS into account when allocating the PCCH. For example, there is no need for puncturing of any resources. Actual OSS allocation need not be signaled to a terminal or wireless device ahead of DCI.

Figure 4:
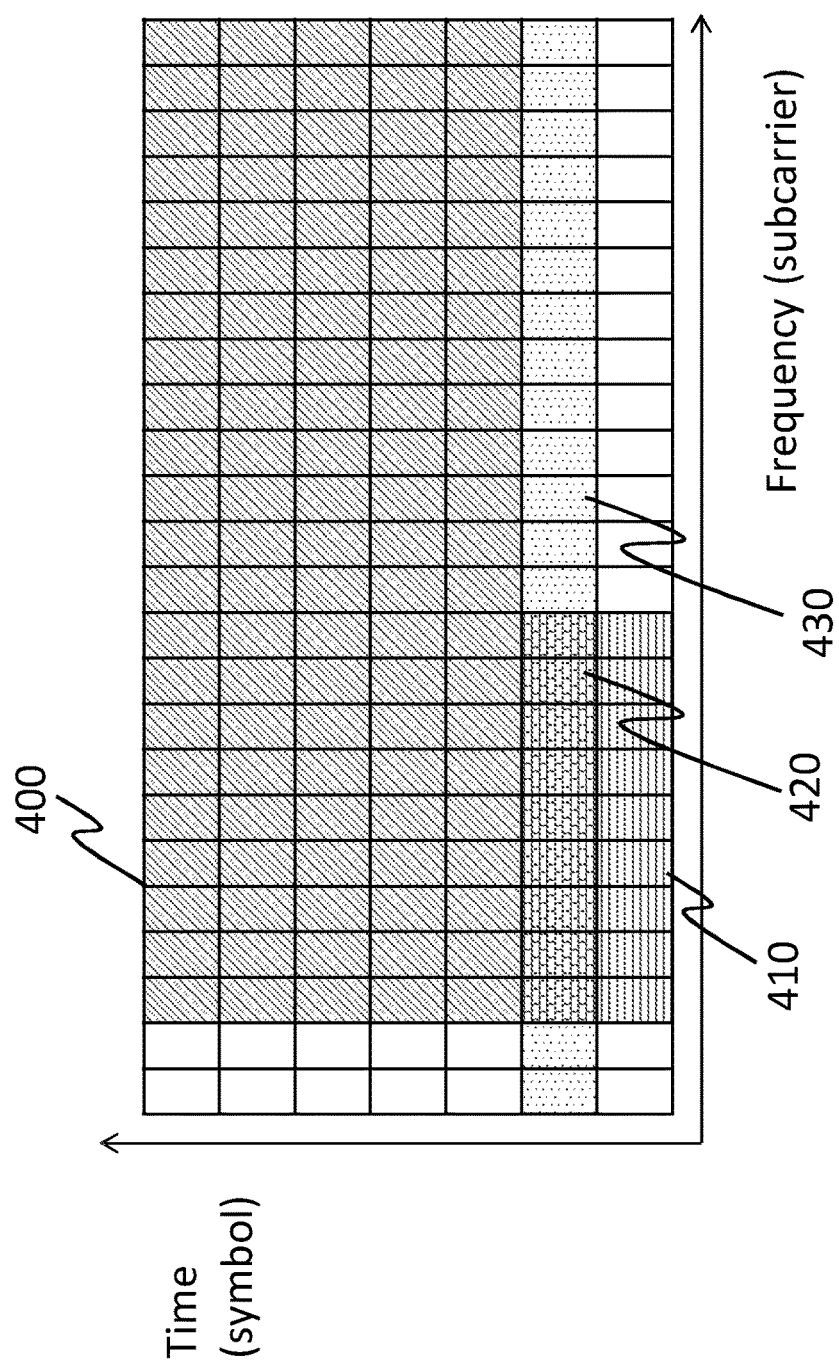
FIG. 4 is a schematic diagram illustrating mapping of channels and signals to a resource grid, according to further possible embodiments.

In FIG. 4 an illustration of the allocation of a wideband reference signal such as the OSS on a time-frequency resource grid is provided. The resource grid comprises 7 multi-carrier modulation symbols, e.g. 7 OFDM symbols in time and 24 subcarriers in frequency dimension, thus forming a grid of 7×24 resource elements (REs). As can be seen in the figure, there are groups of REs are marked with different patterns: REs 400 are diagonally striped, REs 410 are horizontally striped, REs 420 are marked with a brick pattern and REs 430 with a dotted pattern. In this example, the REs 400 are allocated, or mapped, to PDCH (or other channel), REs 410 are allocated, or mapped, to PCCH, REs 420 are allocated, or mapped, to OSS and PCCH and REs 430 are allocated, or mapped, to OSS. The PCCH is thus mapped to two OFDM symbols, whereas OSS is mapped only to one of the OFDM symbols that are mapped to PCCH. The OSS is thus superimposed or overlaid on a part, or portion, of at least one OFDM symbol that is used for transmitting control information on PCCH.

Unless the OSS is used for power measurement, the transmit power of the OSS and its relation to PCCH or PDCH may be transparent to the terminal or wireless device.

In case multiple multi-carrier modulation symbols, e.g. OFDM symbols, are used for PCCH in the same subframe, the OSS may be allocated to any set or subset of these symbols.

Signaling of OSS Parameters

The parameters of the reference signal, or OSS, define various properties, or attributes, that the reference signal may have. The properties are determined by, and may be seen to correspond to, the actual parameter values of the parameters. In this disclosure, when referring to transactions or operations, the term parameter should where appropriate be understood to mean parameter value. For example, indicating the parameters of OSS explicitly in the DCI should be understood to mean that parameter values are explicitly indicated for such parameters and using an index for determining a pre-configured set of parameters should be understood to mean that the index is used for determining parameter values for the pre-configured set of parameters. The index may in this case for example be a pointer into a table of parameter values for the pre-configured set of parameters.

The parameters of OSS could be indicated in the DCI—either explicitly or as an index that can be used for determining a pre-configured set of parameters. In a simple case the parameters could be indicated by just setting a trigger bit. In another simple case, presence of OSS could be implicitly indicated by presence of scheduling information for the receiving radio equipment in the control information. The parameters relevant to OSS may include:

Parameters determining the sequence, for example seeds initializing a pseudo random generator, Zadoff-Chu root sequence and/or cyclic shift Bandwidth of the reference signal, e.g. OSS Position of the reference signal, e.g. OSS, in the time-frequency resource grid.

Sequence offset parameters, e.g. in case the receiving radio equipment, e.g. a terminal or wireless device, is instructed to use only a part of the bandwidth of the full reference signal such as OSS Transmit power, needed for performing power measurements on the reference signal, e.g. OSS, e.g. for setting the AGC—however not needed if only timing related information is estimated from the reference signal, e.g. OSS.

Quasi co-location parameters—for determining what estimates derived from OSS may be used to infer characteristics of the channel experienced by the associated data transmission—e.g. a data transmission indicated in DCI to be received in the subframe.

Which PDCH is associated with the reference signal or OSS, e.g. for determining parameters of the reference signal or OSS coupled to parameters related to that associated PDCH.

The parameters of the reference signal or OSS may be coupled to other information transmitted in the same DCI. Such coupling may increase signaling efficiency. Example of parameters that may be tied to the reference signal or OSS parameters may include:

Modulation and/or Multiple Input Multiple Output (MIMO) order of the data channel. For example, the reference signal or OSS may be present only if 16QAM or higher modulation order is used on the data channel.

Bandwidth of the data channel. For example, the bandwidth of the reference signal or OSS may be expressed as multiples of the bandwidth of the data channel.

Position of the data channel in the time-frequency resource grid.

The identity of the terminal or wireless device that is scheduled to receive the data channel or PDCH by the DCI received on the PCCH in a subframe.

The allocation of the PCCH. For example, the reference signal or OSS may be allocated to, or mapped to, the same OFDM symbols as PCCH or the first OFDM symbol used by PCCH, or the last OFDM symbol occupied by the PCCH.

The DCI carrying the reference signal, or OSS, parameters may be mapped to a common search space or to a UE specific search space, i.e. to a search space specific to the receiving radio equipment, e.g. a terminal or wireless device. The reference signal, or OSS, parameters may be multiplexed with other data in a DCI message or they may have a dedicated DCI message.

A receiving radio equipment, here termed as a UE, could also be configured to expect that the reference signal, or OSS, is always transmitted together with PCCH. As an example, as soon as UE detects PCCH it may know that OSS is present and it may use its preconfigured OSS configuration to detect OSS. In the simplest case the UE is configured with one configuration, no blind decoding at the UE is needed; if a UE has multiple OSS configurations it needs to tests multiple hypotheses using blind decoding.

One can even consider that the NW only configures the UE with one or multiple OSS configurations. When the UE detects a PCCH it must blindly detect if and which OSS configuration is present by trying different preconfigured options. This alternative means that signaling of parameters for the reference signal or OSS in the control information can be avoided.

Transmitter Aspects

Figure 5:
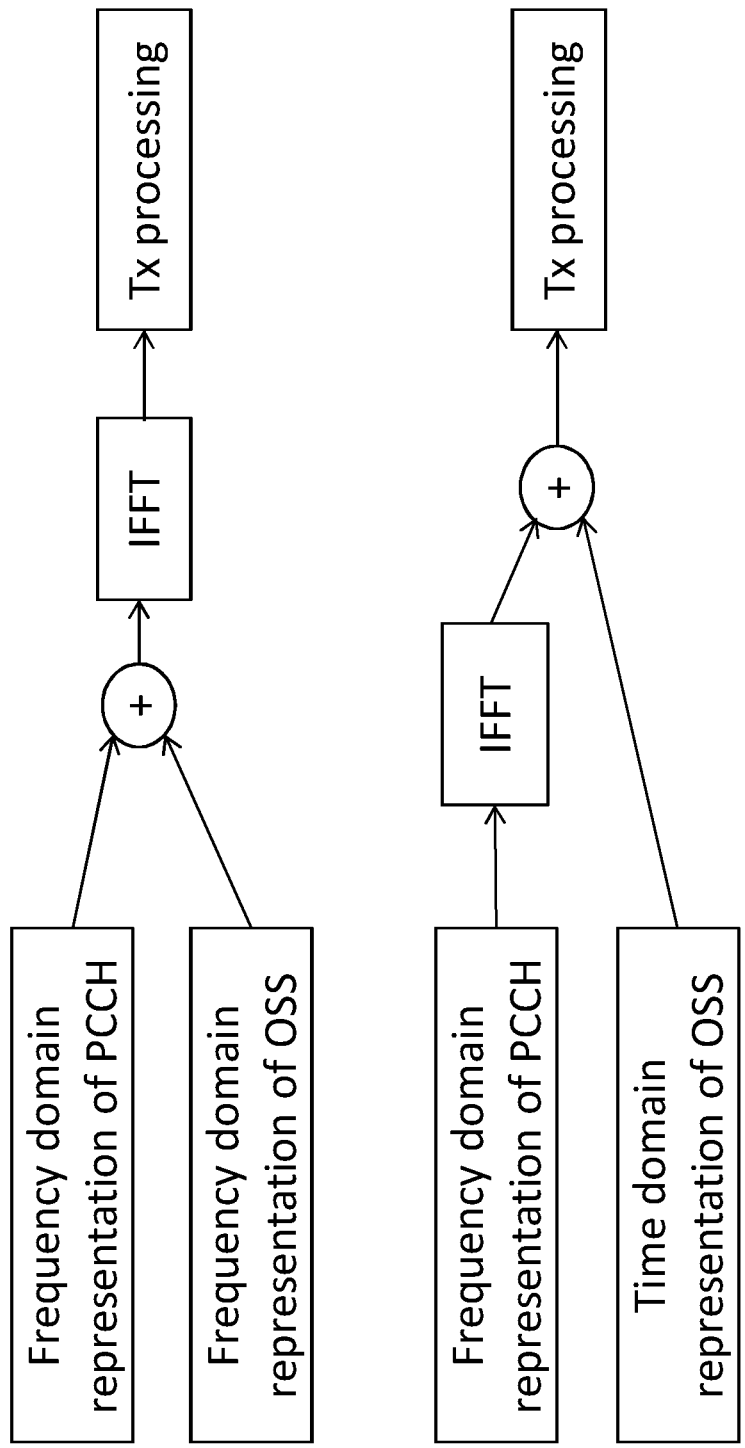
FIG. 5 is a schematic diagram illustrating how a reference signal and a control channel may be superimposed in time or frequency, according to further possible embodiments.

The reference signal, or OSS, and other signals, such as PCCH, transmitted on the same multi-carrier modulation symbol, or OFDM symbol, may be superimposed in time domain or frequency domain. This is illustrated in FIG. 5, where it is illustrated how a frequency domain representation of PCCH may either be combined with a frequency domain representation of OSS prior to performing Inverse Fast Fourier Transform (IFFT) on the combination of the frequency domain representations into a time domain representation of the combination or, as an alternative, the frequency domain representation of PCCH may be combined with a time domain representation of OSS after having performed IFFT on the frequency domain representation of the PCCH into a time domain representation of the PCCH. In both cases, a superimposed combination of the OSS and the PCCH results, which is input to transmit (Tx) processing.

Receiver Aspects

Figure 6:
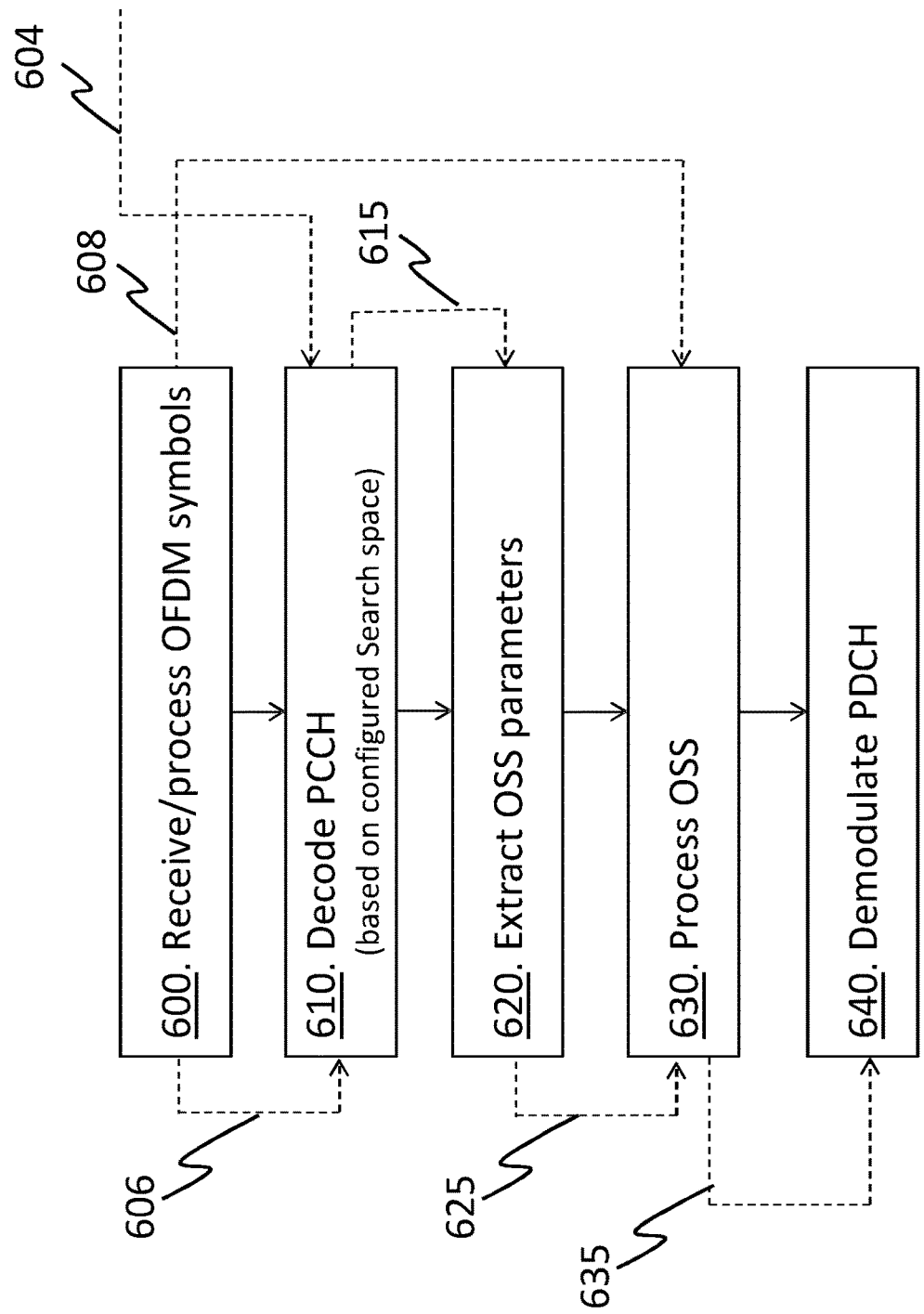
FIG. 6 is a flow chart illustrating a procedure in a receiving radio equipment, according to further possible embodiments.

The PCCH must be detected before the OSS can be processed if PCCH is in the same OFDM symbol and carries information needed to receive the OSS. Then OSS processing may not start until the PCCH carrying OSS parameters is fully decoded. This may require the receiver to buffer OFDM symbols. An exemplary procedure for using OSS to receive and demodulate PDCH is illustrated in FIG. 6, which is a schematic flow chart of receiver processing for OSS and PCCH in five steps illustrated by boxes with dashed lines indicating the data flow between the different steps. In a first step 600, the receiving radio equipment, e.g. a terminal or wireless device, receives and processes OFDM symbols. Time or frequency representations of received data 606 is then provided as input to a second step 610, where the receiving radio equipment decodes PCCH. For the decoding of PCCH, search space configuration 604 is used as input for trying different candidate positions for PCCH in the time-frequency resource grid. As a result of the decoding of PCCH, a DCI message 615 is detected, which is input to the third step 620, where the receiving radio equipment extracts OSS parameters based on the DCI message. The extracted OSS parameters 625 are then input to a fourth step 630, where the receiving radio equipment processes the OSS using time or frequency representations of received data 608 obtained as a result of the reception and processing of OFDM symbols in the first step 600. In a last step 640 the receiving radio equipment then demodulates PDCH using estimated quantities 635 resulting from the processing of OSS in step 630.

Scheduling Aspects

The scheduler, in the transmitting radio equipment, e.g. a base station, needs to determine if the reference signal, e.g. OSS, should be transmitted, and from which antenna points/ports, with which precoder, and with which parameters it should be transmitted.

The scheduler may choose to configure multiple receiving radio equipments, e.g. terminals or wireless devices, to use the same reference signal or OSS. This may be done by signaling the same reference signal or OSS parameters to multiple terminals or wireless devices.

The scheduler may choose to configure different receiving radio equipments with different reference signals or OSSs. This may be necessary if the corresponding data channels are transmitted from different antenna points. In this scenario the two or more OSS instances must be sufficiently orthogonal. This may be achieved by appropriate selection of sequences for the reference signals or OSSs.

The transmission power of the reference signals or OSS and PCCH will be controlled by the network. The following criteria need to be fulfilled:

Total power budget must be kept.
PCCH SNR at the receiving radio equipments, e.g. terminals or wireless devices, must not become too low. PCCH link adaptation may be used together with power control to ensure this is the case.
Estimation performance for the reference signals or OSS needs to be sufficient given the modulation order of the data channel.

Deployment/MIMO Processing Aspects

In some embodiments herein it is assumed that the reference signal or OSS is quasi co located with PDCH at least w.r.t time. This may mean that OSS is transmitted from the same antennas or antenna ports, or at least from antennas or antenna ports co-located with those transmitting the corresponding PDCH. OSS need not be quasi co located with PCCH.

The reference signal or OSS is typically transmitted on the same carrier as the PCCH. In case PCCH schedules a PDCH on a different carrier, the reference signal may be transmitted on the data channel carrier. It may for example potentially overlap resources where control information is transmitted on that carrier. This means in other words that the reference signal or OSS may be superimposed on at least a portion of one or more multi-carrier modulation symbols that is used for transmitting control information on that carrier.

Detection of PCCH and Estimation Based on OSS

The reference signal or OSS may be used for accurate time synchronization. It may also be used to determine delay spread and other parameters used for channel estimation.

As a possible extension, OSS may be used for power related measurements. PCCH may be detected independently of the OSS.

As an extension, Successive Interference Cancellation (SIC) may be used—effectively removing the interference caused by own PCCH.

While the solution for providing fine time synchronization has in the above been discussed in the context of a 5G or NR network using OFDM as multi-carrier modulation technique, the solution is however not limited to such a network and such multi-carrier modulation technique. Rather, the solution is applicable to any communication scenario using multi-carrier modulation techniques. For example, it is conceivable to apply the solution in a 5G or NR network using e.g. Windowed OFDM (W-OFDM), Filtered OFDM (f-OFDM) or Discrete Fourier Transform Spread OFDM (DFTS-OFDM) for multicarrier modulation. A non-exhaustive list of different multicarrier modulation techniques for which the teaching of embodiments herein could be applied includes: OFDM, Windowed OFDM (W-OFDM), Filtered OFDM (f-OFDM), DFTS-OFDM, Filterbank multicarrier (FBMC), Circular offset FBMC (CO-FBMC), Generalized frequency division multiplexing (GFDM), Universal filtered OFDM (UF-OFDM), Unique word OFDM (UW OFDM), Coded OFDM (COFDM) and Vector orthogonal OFDM (VOFDM).

Figure 7:
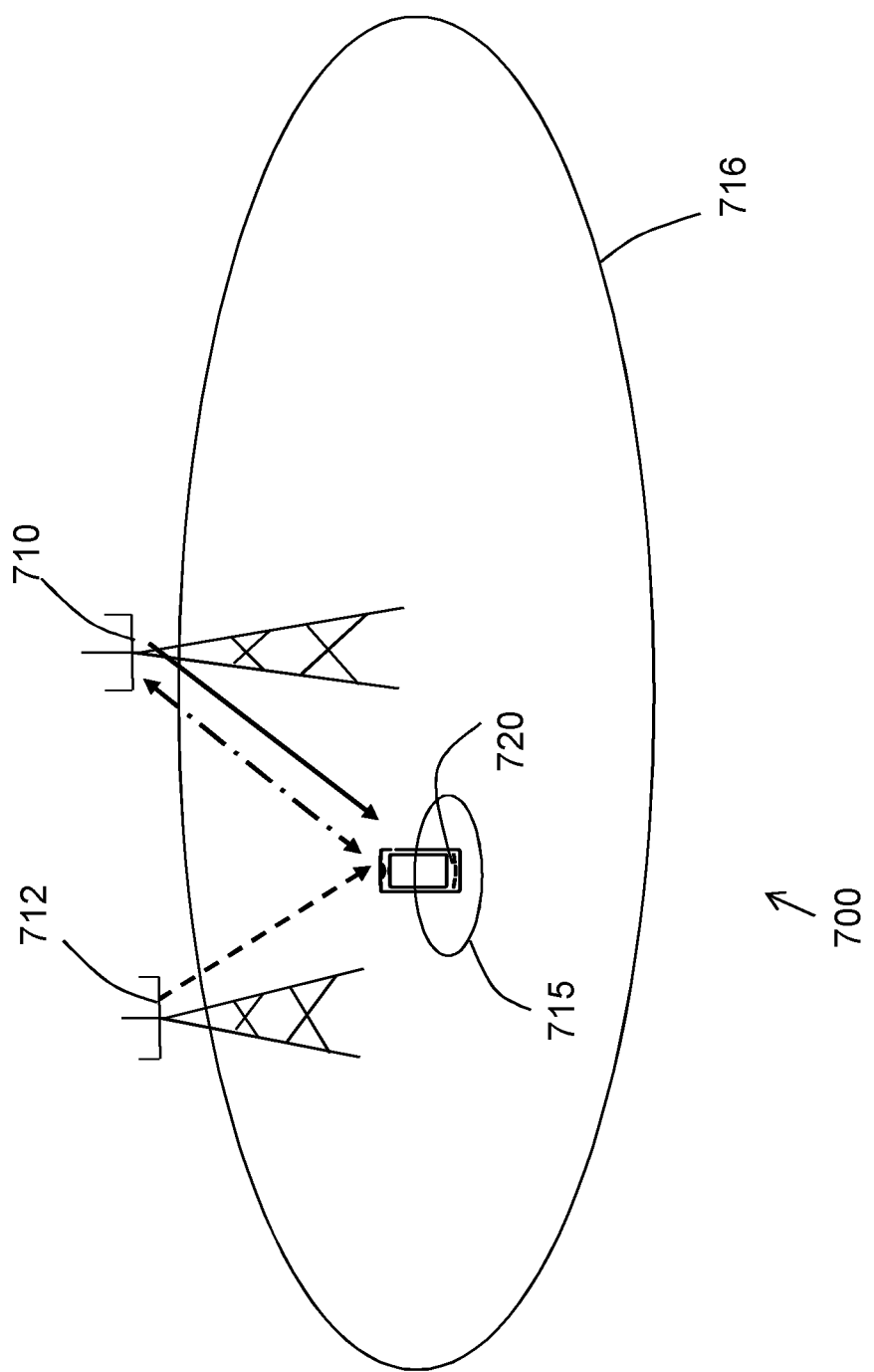
FIG. 7 illustrates a communication scenario, according to further possible embodiments.

FIG. 7 depicts a communication scenario in a communications network 700 where the presented solution for using a reference signal in communication between a transmitting radio equipment 710 and at least one receiving radio equipment 720 may be employed. In the communication scenario, the at least one receiving radio equipment 720 is connected to the communications network 700 via the transmitting radio equipment 710 and may communicate with the transmitting radio equipment 710 to receive and transmit data and control information and to receive reference signals, e.g. for measurement purposes. The transmitting radio equipment 710 is capable of supporting receiving radio equipments such as wireless devices within a coverable area 716. Transmissions targeting a specific receiving radio equipment or wireless device within the coverable area are typically made, e.g. using beamforming, to fall within a part of the coverable area where the targeted wireless device is currently located. For example, a data transmission to the at least one receiving radio equipment 720 may be directed using beamforming to the coverage area 715 where the at least one receiving radio equipment 720 is currently located, as indicated by the double-directed dashed-and-dotted arrow in FIG. 7. The double-direction of the arrow serves to indicate that the at least one receiving radio equipment 720 may also transmit data and control information to the transmitting radio equipment 710 in a directed manner, for example using beamforming. The at least one receiving radio equipment 720 receives scheduling information for the data transmissions to or from the at least one receiving radio equipment 720 in control information which may be transmitted by the transmitting radio equipment 710, as indicated by the continuous arrow in FIG. 7, or by another transmitting radio equipment 712, as indicated by the dashed arrow in FIG. 7. The scheduling information may be comprised in the control information in form of a DCI message in a subframe. The DCI message may comprise a downlink assignment scheduling a data transmission to the at least one receiving radio equipment 720 in the subframe, or an uplink grant scheduling a data transmission to be made by the at least one receiving radio equipment 720 in a subsequent subframe. The control information may also comprise other scheduling information for the at least one receiving radio equipment 720, such as scheduling information for measurements to be performed and/or reported by the at least one receiving radio equipment 720. Examples of such measurements may be positioning measurements or power measurements.

The at least one receiving radio equipment 720 may be any communication entity capable of radio communication with a radio network or communications network by sending and receiving radio signals and the transmitting radio equipments 710, 712 may be any node or equipment of a radio network or communications network that is arranged to communicate radio signals with wireless devices, as defined above. In particular, the receiving radio equipment 710 may be a wireless device and the transmitting radio equipments 710, 712 may be two base stations or two transmission points, commonly controlled by one base station or each controlled by a respective base station. The transmitting radio equipments 710, 712 may be interconnected via a network interface to exchange information e.g. via a backbone network.

Figure 8:
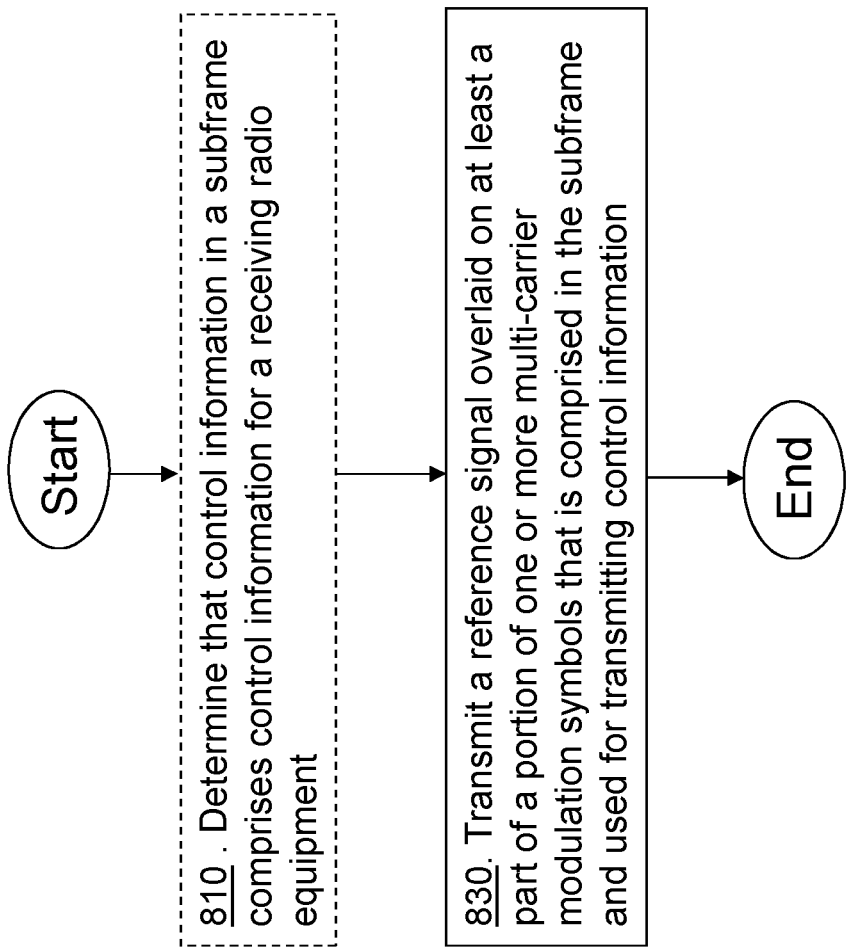
FIG. 8 is a flow chart illustrating a procedure in a transmitting radio equipment, according to further possible embodiments.

An example of how the solution may be employed in terms of actions performed by a first radio equipment of a communications network will now be described with reference to the flow chart in FIG. 8 which illustrates how the first radio equipment, exemplified by the transmitting radio equipment 710, may operate to transmit a reference signal in a subframe where a portion of one or more multi-carrier modulation symbols that are comprised in the subframe is used for transmitting control information. The reference signal may be a wideband reference signal, having a bandwidth that is wider than a bandwidth of a more narrowband signal to be received, transmitted or measured upon by at least one receiving radio equipment 720 that receives the reference signal. The bandwidth of the wideband reference signal may be wider than the bandwidth of the narrowband signal by at least a pre-determined amount, e.g. expressed as a multiple of the bandwidth of the more narrowband signal. The portion of the one or more multi-carrier modulation symbols may comprise a part of or the entire one or more multi-carrier modulation symbols. The control information may be transmitted by the transmitting radio equipment 710 or by another transmitting radio equipment 712. The transmitting radio equipment 710 may in the latter case obtain information the control information via the above mentioned network interface. The actions of the method may be performed in any suitable order.

In a first action 810 the transmitting radio equipment 710 may optionally determine that control information that is transmitted in the subframe comprises control information intended for the at least one receiving radio equipment 720. The determination may be made based on information regarding the control information obtained via the above mentioned network interface interconnecting different network nodes such as the transmitting radio equipment 710 and the another transmitting radio equipment 712.

The first action 810 need not be performed e.g. for embodiments where the control information is transmitted by the transmitting radio equipment 710.

In a second action 830 the transmitting radio equipment 710 transmits the reference signal overlaid or superimposed on at least a part of the portion of the one or more multi-carrier modulation symbols that is used for transmitting the control information in the subframe. The reference signal is intended for use by the at least one receiving radio equipment 720 and the reference signal is generated based on at least one parameter that may be used by the at least one receiving radio equipment 720 for determining one or more properties of the transmitted reference signal, thereby enabling the at least one receiving radio equipment 720 to determine said one or more properties of the transmitted reference signal. The reference signal may in some embodiments have been generated based on the at least one parameter by the transmitting radio equipment 710 prior to being transmitted. In other embodiments the reference signal may have been generated based on the at least one parameter by another equipment, node or server comprised in or connected to the communications network, whereupon information regarding the generated reference signal is obtained at the transmitting radio equipment 710 for the transmission of the reference signal.

The reference signal may in some embodiments be intended for use by the at least one receiving radio equipment 720 for obtaining a refined time synchronization needed for demodulation and/or decoding of a downlink signal associated with said control information. The downlink signal is intended to be received by the at least one receiving radio equipment 720. The downlink signal may for example be a data transmission scheduled for the at least one receiving radio equipment 720 in the subframe. The data transmission may be scheduled on a data channel and associated with scheduling information comprised in said control information.

The reference signal may be transmitted from an antenna port that is co-located or quasi co-located at least with respect to time with an antenna port used for transmitting the downlink signal. The quasi co-location may be specified by quasi co-location parameters that may be used for determining what estimates derived from the reference signal may be used to infer channel characteristics experienced by the downlink signal, e.g. the data transmission.

The reference signal may thus further be intended for use by the at least one receiving radio equipment 720 for determining parameters used for computing a channel estimate that is to be used for demodulating and/or decoding the downlink signal associated with said control information.

Alternatively or additionally, the reference signal may be intended for use by the at least one receiving radio equipment 720 for obtaining a refined time synchronization needed for transmission of an uplink signal associated with said control information. The uplink signal may for example be a data transmission scheduled for the at least one receiving radio equipment 720 in a subsequent subframe. The data transmission may be scheduled on a data channel and may be associated with scheduling information comprised in said control information. The refined time synchronization may be needed by the receiving radio equipment 720 for determining how to apply a timing advance for the data transmission.

In further embodiments, the reference signal may alternatively or additionally be intended for use by the at least one receiving radio equipment 720 for measurements for positioning. The reference signal may for example serve as a timing reference for the positioning measurements. In yet further embodiments, the reference signal may alternatively or additionally be intended for use by the at least one receiving radio equipment 720 for power measurements.

The at least one parameter may in some embodiments be pre-configured in the at least one receiving radio equipment 720, e.g. in form of a set of pre-configured parameters. The pre-configuration of the at least one parameter enables the at least one receiving radio equipment 720 to determine the one or more properties of the reference signal according to parameter values as pre-configured for the at least one parameter or set of preconfigured parameters. Alternatively or additionally, the control information may indicate the at least one parameter. When the control information indicates the at least one parameter in addition to that it is pre-configured, the indication in the control information could either prevail over the pre-configuration, or the pre-configuration could prevail over the indication, depending on implementation.

The at least one parameter may include one or more of the following parameters:
1) parameters determining a sequence used for the reference signal,
2) a bandwidth of the reference signal,
3) a position in a time-frequency resource grid of the reference signal,
4) sequence offset parameters for using only a part of the bandwidth of the reference signal,
5) a transmit power of the reference signal,
6) quasi co-location parameters, and
7) a data channel associated with the reference signal. The data channel may be a data channel upon which a data transmission is scheduled for the at least one receiving radio equipment 720 in the subframe.

The at least one parameter may further comprise a presence parameter for indicating, as a presence property, whether or not the reference signal is present in the subframe. Based on the presence parameter the at least one receiving radio equipment 720 may determine that the reference signal is present in the subframe before processing the reference signal. In one example the presence parameter is a position in a time-frequency resource grid of a control channel carrying scheduling information intended for the at least one receiving radio equipment 720. In this example the transmission of the reference signal by the transmitting radio equipment 710 is coupled to or dependent on whether or not the control channel is located on the position in the time-frequency resource grid, such that when the control channel is located on the position in the time-frequency grid, the reference signal is present in the subframe. The position may be a particular or pre-determined position in the time-frequency grid. In another example, the presence parameter is scheduling information for the at least one receiving radio equipment being present or comprised in the transmitted control information. In this example the transmission of the reference signal by the transmitting radio equipment 710 is coupled to or dependent on whether or not the control information comprises scheduling information for the at least one receiving radio equipment 720, such that when the control information comprises scheduling information for the at least one receiving radio equipment 720, the reference signal is present in the subframe. The scheduling information may in some embodiments be comprised in a DCI message in the control information.

In some embodiments, the at least one parameter may comprise one or more parameters that are indicated to the at least one receiving radio equipment 720 by being explicitly signalled to the at least one receiving radio equipment 720 in the control information. The one or more parameters may in some embodiments be comprised in scheduling information, e.g. in a DCI message, in the control information. The explicit signalling of the one or more parameters enables at least one of the one or more properties of the reference signal to be determined based on the explicitly signalled one or more parameters. In one example, the at least one parameter may alternatively or additionally comprise an index indicating at least one of the one or more properties of the transmitted reference signal out of a pre-configured set of properties known to the at least one receiving radio equipment 720. The index may e.g. be one of the explicitly signalled one or more parameters. The pre-configured set of properties may for example be implemented in form of a table of parameter values for the preconfigured set of parameters in the at least one receiving radio equipment 720.

Alternatively or additionally, the at least one parameter may comprise one or more parameters that are implicitly signalled or indicated in the control information to the at least one receiving radio equipment 720 by being coupled to or dependent on one or more other parameters indicated in the control information. The one or more other parameters may in some embodiments be comprised in scheduling information, e.g. in a DCI message, in the control information. The implicit signalling of the one or more parameters enables at least one of the one or more properties of the reference signal to be determined based on the implicitly signalled one or more parameters.

The one or more other parameters indicated in the control information may include one or more parameters related to a data transmission scheduled for the at least one receiving radio equipment. The data transmission may be scheduled on a data channel and associated with scheduling information comprised in said control information. The scheduling information may for example be a downlink assignment scheduling the data transmission to the at least one receiving radio equipment 720 in the subframe, or an uplink grant scheduling the data transmission to be made by the at least one receiving radio equipment 720 in a subsequent subframe. The one or more parameters related to the data transmission may be one or more of:
1) a modulation order and/or multiple input multiple output, MIMO, order used on the data channel,
2) a bandwidth of the data channel,
3) a position in a time-frequency resource grid of the data channel,
4) an identity of the at least one receiving radio equipment 720, and
5) an allocation of a control channel carrying the scheduling information.

Figure 9:
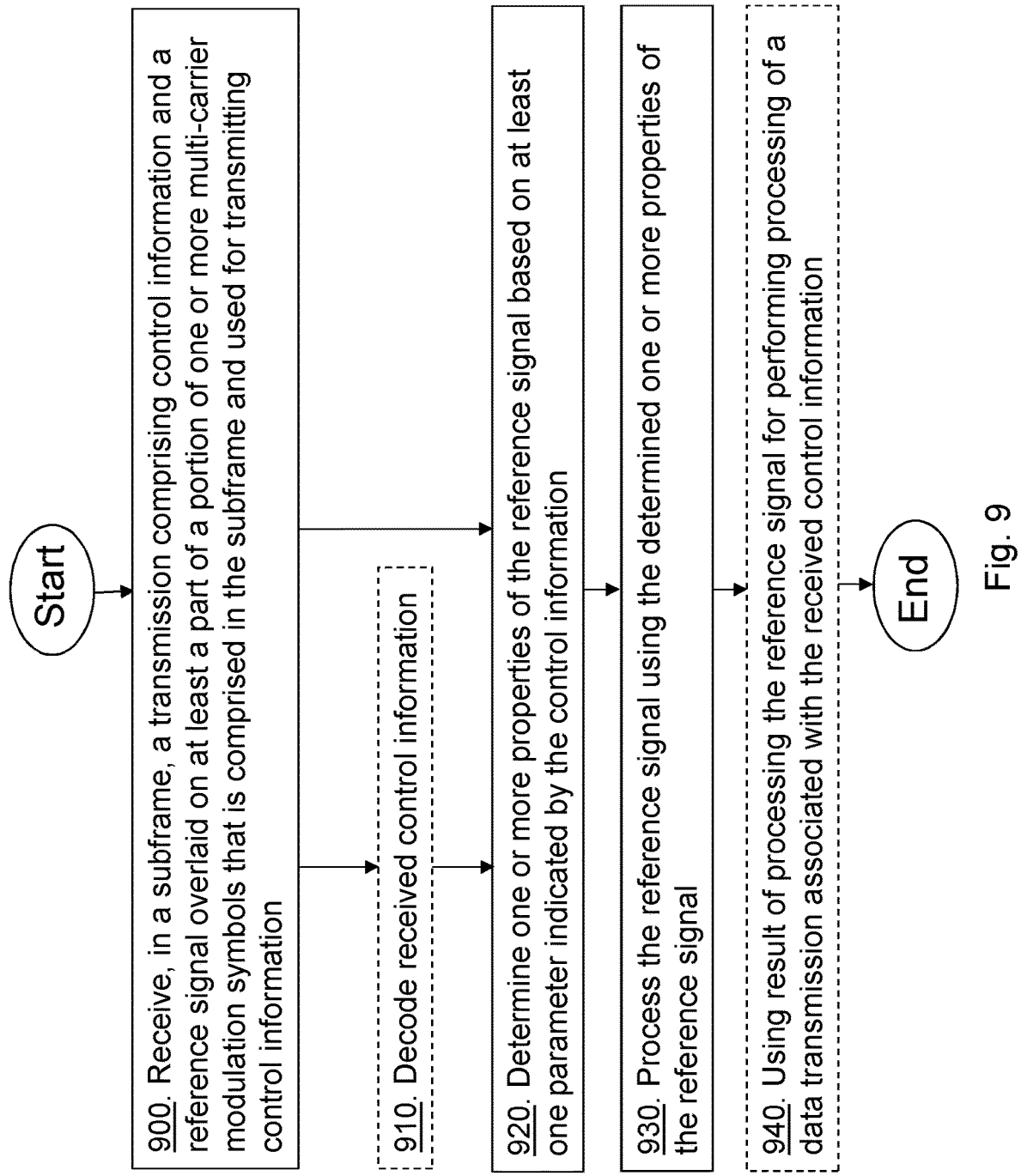
FIG. 9 is a flow chart illustrating a procedure in a receiving radio equipment, according to further possible embodiments.

An example of how the solution may be employed in terms of actions performed by a second radio equipment will now be described with reference to the flow chart in FIG. 9 which illustrates how the second radio equipment, exemplified by the receiving radio equipment 720, may operate to receive a reference signal transmitted by the transmitting radio equipment 710 in a subframe where a portion of one or more multi-carrier modulation symbols that are comprised in the subframe is used for transmitting control information. As mentioned above in relation to the method performed by the transmitting radio equipment 710, the reference signal may be a wideband reference signal having a bandwidth that is wider than a bandwidth of a more narrowband signal to be received, transmitted or measured upon by the receiving radio equipment 720 and the portion of the one or more multi-carrier modulation symbols may comprise a part of or the entire one or more multi-carrier modulation symbols. The actions of the method may be performed in any suitable order.

In a first action 900 the receiving radio equipment 720 receives a transmission in the subframe. The transmission comprises the control information and the reference signal. The reference signal is overlaid or superimposed on at least a part of the portion of the one or more multi-carrier modulation symbols that is used for transmitting the control information. The reference signal may in some embodiments be a reference signal transmitted by the transmitting radio equipment 710 from an antenna port that is co-located or quasi co-located at least with respect to time with an antenna port used for transmitting a data transmission scheduled for the receiving radio equipment 720 and associated with scheduling information comprised in said control information. In other embodiments the reference signal may be a reference signal transmitted from an antenna port that is not co-located or quasi co-located with respect to time with an antenna port used for transmitting such a data transmission.

In a second action 910 the receiving radio equipment 720 may optionally decode the received control information prior to determining one or more properties of the reference signal. The one or more properties of the reference signal may then be determined based on at least one parameter in a following third action 920.

The action 910 may need to be performed prior to action 920 for embodiments where one or more parameters for determining at least one of the one or more properties of the reference signal are signalled in the control information. In some such embodiments, the at least one parameter may comprise one or more parameters that are indicated to the receiving radio equipment 720 by being explicitly signalled to the receiving radio equipment 720 in the control information.

The one or more parameters may in some embodiments be comprised in scheduling information, e.g. in a DCI message, in the control information. At least one of the one or more properties of the reference signal may be determined by the receiving radio equipment 720 based on the explicitly signalled one or more parameters after that the control information has been decoded. In one example, the at least one parameter may alternatively or additionally comprise an index indicating at least one of the one or more properties of the reference signal out of a pre-configured set of properties known to the receiving radio equipment 720. The index may e.g. be one of the explicitly signalled one or more parameters. The pre-configured set of properties may for example be implemented in form of a table of parameter values for the preconfigured set of parameters in the receiving radio equipment 720.

Alternatively or additionally, the at least one parameter may comprise one or more parameters that are implicitly signalled or indicated in the control information to the receiving radio equipment 720 by being coupled to or dependent on one or more other parameters indicated in the control information. The one or more other parameters may in some embodiments be comprised in scheduling information, e.g. in a DCI message, in the control information. At least one of the one or more properties of the reference signal may be determined by the receiving radio equipment 720 based on the implicitly signalled one or more parameters after that the control information has been decoded.

The one or more other parameters indicated in the control information may include one or more parameters related to a data transmission scheduled for the receiving radio equipment 720. The data transmission may be scheduled on a data channel and associated with scheduling information comprised in said control information. The scheduling information may for example be a downlink assignment scheduling the data transmission to the receiving radio equipment 720 in the subframe, or an uplink grant scheduling the data transmission to be made by the receiving radio equipment 720 in a subsequent subframe. The one or more parameters related to the data transmission may be one or more of:

1) a modulation order and/or multiple input multiple output, MIMO, order used on the data channel,
2) a bandwidth of the data channel,
3) a position in a time-frequency resource grid of the data channel,
4) an identity of the receiving radio equipment 720, and
5) an allocation of a control channel carrying the scheduling information. The second action 910 need not be performed for embodiments where the receiving radio equipment 720 may determine the one or more properties of the reference signal without decoding the control information, e.g. for embodiments where possible properties are pre-configured in the receiving radio equipment 720.

In the third action 920 the receiving radio equipment 720 determines the one or more properties of the reference signal based on the at least one parameter. The at least one parameter may in some embodiments be pre-configured in the receiving radio equipment 720, e.g. in form of a set of pre-configured parameters. The receiving radio equipment 720 may then determine the one or more properties of the reference signal according to parameter values as pre-configured for the at least one parameter or set of preconfigured parameters. For example, determining the one or more properties of the reference signal based on the at least one parameter may comprise blindly decoding the reference signal based on the pre-configured at least one parameter or set of pre-configured parameters to determine the one or more properties of the reference signal. The at least one parameter may further, alternatively or additionally, be indicated by the control information comprised in the received transmission. When the at least one parameter is indicated by the control information in addition to that it is pre-configured, the indication in the control information could either prevail over the pre-configuration, or the pre-configuration could prevail over the indication, depending on implementation.

The at least one parameter may include one or more of the following parameters:
1) parameters determining a sequence used for the reference signal,
2) a bandwidth of the reference signal,
3) a position in a time-frequency resource grid of the reference signal,
4) sequence offset parameters for using only a part of the bandwidth of the reference signal,
5) a transmit power of the reference signal,
6) quasi co-location parameters, and
7) a data channel associated with the reference signal. The data channel may be a data channel upon which a data transmission is scheduled for the receiving radio equipment 720 in the subframe.

The at least one parameter may further comprise a presence parameter for indicating, as a presence property, whether or not the reference signal is present in the subframe. Determining the one or more properties of the reference signal may then comprise determining, based on the presence parameter, that the reference signal is present in the subframe before processing the reference signal. In one example the presence parameter is a position in a time-frequency resource grid of a control channel carrying scheduling information intended for the receiving radio equipment 720. In this example the location of the control channel in the time-frequency resource grid is coupled to or dependent on whether or not the reference signal is present in the subframe, such that when the control channel is located on the position in the time-frequency grid, the receiving radio equipment 720 may determine that the reference signal is present in the subframe. The position may be a particular or pre-determined position in the time-frequency grid.

In another example, the presence parameter is scheduling information for the receiving radio equipment 720 being present or comprised in the received control information. In this example the presence of the reference signal in the subframe is coupled to or dependent on whether or not the control information comprises scheduling information for the receiving radio equipment 702, such that when the control information comprises scheduling information for the receiving radio equipment 702, the receiving radio equipment 720 may determine that the reference signal is present in the subframe. The scheduling information may in some embodiments be comprised in a DCI message in the control information.

In a fourth action 930 the receiving radio equipment 720 processes the reference signal using the determined one or more properties of the reference signal. The processing may comprise determining a refined or more accurate time synchronization. The refined time synchronization may in some embodiments be needed for processing of a data transmission scheduled for the receiving radio equipment 720. The data transmission may be scheduled on a data channel and associated with scheduling information comprised in the control information. The data transmission may be a downlink data transmission or an uplink data transmission.

In some embodiments, processing the reference signal may comprise determining parameters to be used for computing a channel estimate. The channel estimate may be needed for demodulating a downlink data transmission. The reference signal may then be a reference signal transmitted from an antenna port that is co-located or quasi co-located at least with respect to time with an antenna port used for transmitting the downlink data transmission. The quasi co-location may be specified by quasi co-location parameters that may be used for determining what estimates derived from the reference signal may be used to infer channel characteristics experienced by the downlink data transmission.

In further embodiments, processing the reference signal may alternatively or additionally comprise using the reference signal for performing measurements for positioning. The processing may for example serve to obtain a timing reference for the positioning measurements. In yet further embodiments, processing the reference signal may alternatively or additionally comprise using the reference signal in power measurements.

In a fifth action 940 the receiving radio equipment 720 may optionally use a result of said processing of the reference signal for performing processing of a data transmission scheduled for the receiving radio equipment 720. The data transmission may be scheduled on a data channel and associated with scheduling information comprised in the control information.

The data transmission may in some embodiments comprise a downlink data transmission to the receiving radio equipment 720 in the subframe, for which the result of said processing of the reference signal is a refined time synchronization needed for the processing of the downlink data transmission at the receiving radio equipment 720. The processing of the downlink data transmission may for example comprise demodulation and/or decoding of the downlink data transmission. In the demodulation of the downlink data transmission a channel estimate, computed from parameters determined as a result of said processing of the reference signal, may be used.

Alternatively or additionally, the data transmission on the data channel scheduled for the receiving radio equipment 720 and associated with scheduling information comprised in said control information may comprise an uplink data transmission from the receiving radio equipment 720 in another subframe, e.g. a subsequent subframe, for which the result of said processing of the reference signal is a refined time synchronization needed for the processing of the uplink data transmission at the receiving radio equipment 720. The processing of the uplink data transmission may for example comprise determining a transmission time for the uplink data transmission.

Figure 10:
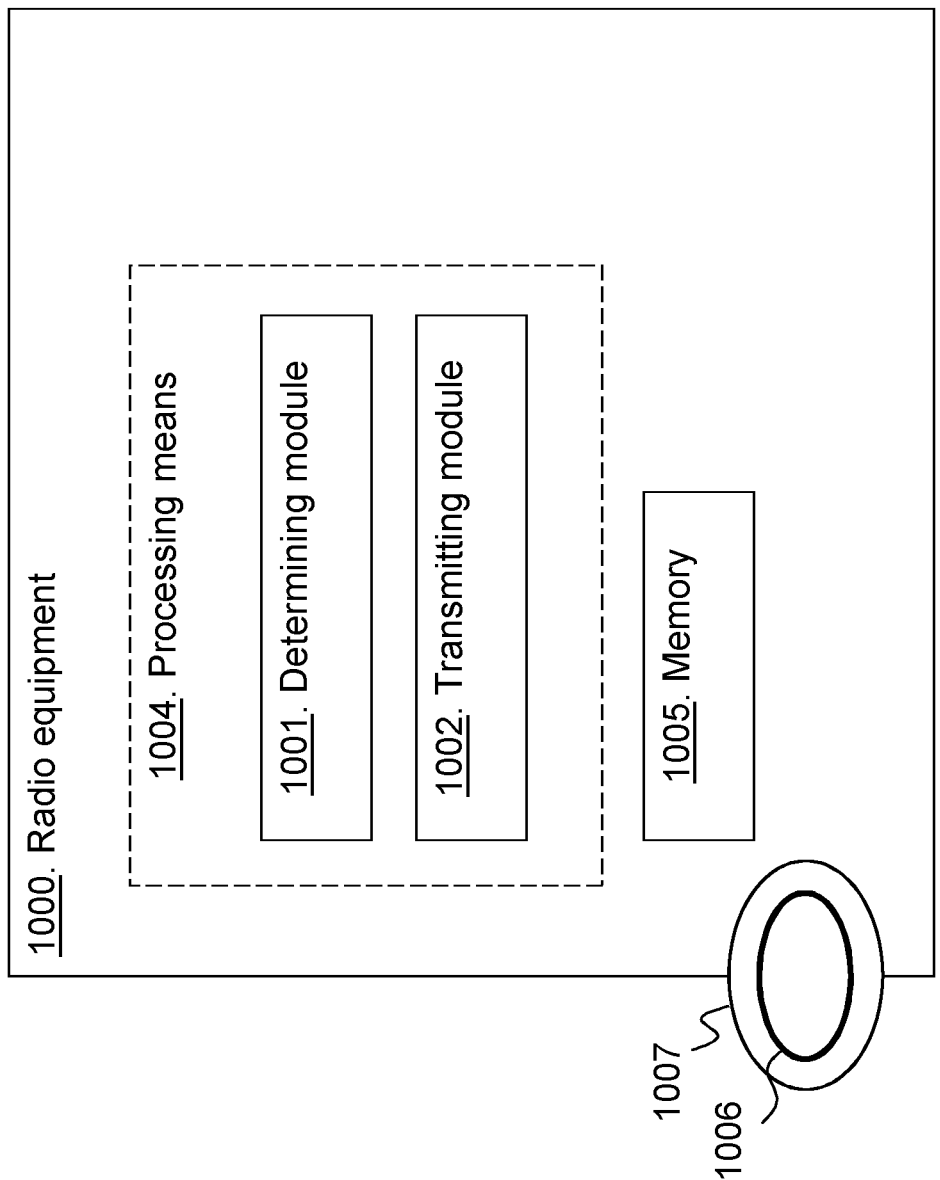
FIG. 10 is a block diagram illustrating a radio equipment for performing the procedure of a transmitting radio equipment, according to further possible embodiments.

In order to perform the method described with reference to FIG. 8 above, a first radio equipment 1000, such as the transmitting radio equipment 710, is provided. FIG. 10 is a block diagram depicting the first radio equipment 1000 for transmitting a reference signal in a subframe where a portion of one or more multi-carrier modulation symbols that are comprised in the subframe is used for transmitting control information.

The first radio equipment 1000 is configured to, by comprising a transmitting module 1002 being configured to, transmit the reference signal overlaid or superimposed on at least a part of the portion of the one or more multi-carrier modulation symbols that is used for transmitting the control information in the subframe. The reference signal is intended for use by at least one receiving radio equipment 720 and the reference signal is generated based on at least one parameter that enables the at least one receiving radio equipment 720 to determine one or more properties of the transmitted reference signal.

The first radio equipment 1000 may further be configured to, by the transmitting module 1002 being configured to, transmit the reference signal from an antenna port that is quasi co-located at least with respect to time with an antenna port used for transmitting a downlink signal associated with said control information. The downlink signal may for example be a data transmission scheduled for the at least one receiving radio equipment 720 in the subframe.

The first radio equipment 1000 may further optionally be configured to, by optionally comprising a determining module 1001 being configured to, determine that control information that is transmitted in the subframe comprises control information intended for the at least one receiving radio equipment 720. The determination may be made based on information regarding the control information obtained via the above mentioned network interface interconnecting different network nodes such as the first radio equipment 710 and the another transmitting radio equipment 712.

The first radio equipment 1000 may further optionally be configured to, by optionally comprising a generating module (not shown) being configured to, generate the reference signal based on the at least one parameter by the first radio equipment 710 prior to it being transmitted. In other embodiments the first radio equipment 710 may have obtained information regarding the generated reference signal from another radio equipment, network node or server comprised in or connected to the communications network.

The embodiments for transmitting a reference signal in a subframe where a portion of one or more multi-carrier modulation symbols that are comprised in the subframe is used for transmitting control information may further be implemented through processing means 1004, for example one or more processors in the first radio equipment 1000 depicted in FIG. 10, e.g. together with computer program code, which processor or processing means 1004 is configured to perform the functions and/or method actions of the embodiments herein. The first radio equipment 1000 may further comprise a memory 1005. The memory 1005 may comprise one or more units to be used to store data on, such as pre-configured information, information on the at least one parameter and the one or more properties of the reference signal, control information such as scheduling information, applications to perform the methods disclosed herein when being executed, and similar.

The methods according to the embodiments described herein for the first radio equipment 1000 may be implemented by means of e.g. a computer program 1006 or a computer program product, comprising instructions, i.e., software code portions, which, when executed on at least one processor, cause the at least one processor to carry out the actions described herein, as performed by the first radio equipment 1000. The computer program 1006 may be stored on a computer-readable storage medium 1007, e.g. a disc or similar. The computer-readable storage medium 1007, having stored there on the computer program 1006, may comprise the instructions which, when executed on at least one processor, cause the at least one processor to carry out the actions described herein, as performed by the first radio equipment 1000. In some embodiments, the computer-readable storage medium 1007 may be a non-transitory computer-readable storage medium.

Figure 11:
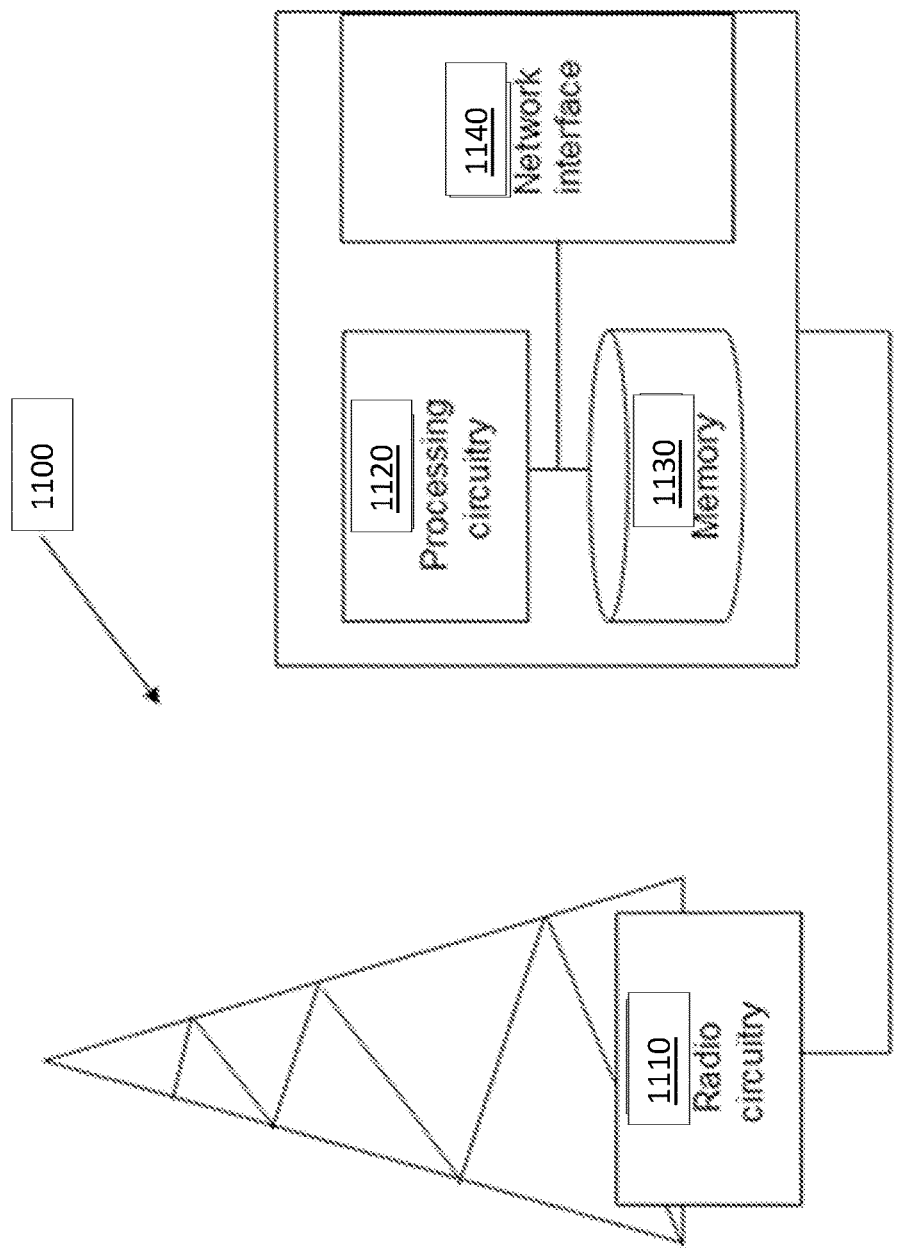
FIG. 11 is another block diagram illustrating a radio equipment for performing the procedure of a transmitting radio equipment, according to further possible embodiments.

In an alternative implementation, in order to perform the method described with reference to FIG. 8 above a first radio equipment 1100, such as the transmitting radio equipment 710, is provided. FIG. 11 is a block diagram depicting the first radio equipment 1100 for transmitting a reference signal in a subframe where a portion of one or more multi-carrier modulation symbols that are comprised in the subframe is used for transmitting control information.

In this alternative embodiment, the first radio equipment 1100 comprises radio circuitry 1110 for wireless communication e.g. with the at least one receiving radio equipment 720, processing circuitry 1120, memory 1130 and a network interface 1140 eg for communicating with other network or radio equipment, such as transmitting radio equipment 712. The first radio equipment 1100 is configured to, by the radio circuitry 1110 being configured to, transmit the reference signal overlaid or superimposed on at least a part of the portion of the one or more multi-carrier modulation symbols that is used for transmitting the control information in the subframe. The reference signal is intended for use by at least one receiving radio equipment 720 and the reference signal is generated based on at least one parameter that enables the at least one receiving radio equipment 720 to determine one or more properties of the transmitted reference signal.

The first radio equipment 1100 may further be configured to, by the radio circuitry 1110 being configured to, transmit the reference signal from an antenna port that is quasi co-located at least with respect to time with an antenna port used for transmitting a downlink signal associated with said control information. The downlink signal may for example be a data transmission scheduled for the at least one receiving radio equipment 720 in the subframe.

The first radio equipment 1100 may further optionally be configured to, by the processing circuitry 1120 being configured to, determine that control information that is transmitted in the subframe comprises control information intended for the at least one receiving radio equipment 720. The determination may be made based on information regarding the control information obtained via the network interface 1140 interconnecting different network nodes such as the first radio equipment 1100 and the another transmitting radio equipment 712.

The first radio equipment 1100 may further optionally be configured to, by processing circuitry 1120 further being configured to being configured to, generate the reference signal based on the at least one parameter by the first radio equipment 710 prior to it being transmitted. In other embodiments the first radio equipment 710 may have obtained information regarding the generated reference signal from another radio equipment, network node or server comprised in or connected to the communications network via the network interface 1140.

The realization of the first radio equipment 1000 as described with reference to FIG. 10 and the alternative realization of the first radio equipment 1100 as described with reference to FIG. 11 may both encompass the following further particulars regarding the at least one parameter and regarding the reference signal, repeated below for completeness but discussed in more detail with reference to FIG. 8 above, illustrating various embodiments of the method that may be performed by any one of the realizations of the first radio equipment 1000, 1100.

The at least one parameter may include one or more of the following parameters:
1) parameters determining a sequence used for the reference signal,
2) a bandwidth of the reference signal,
3) a position in a time-frequency resource grid of the reference signal,
4) sequence offset parameters for using only a part of the bandwidth of the reference signal,
5) a transmit power of the reference signal,
6) quasi co-location parameters, and
7) a data channel associated with the reference signal. The data channel may be a data channel upon which a data transmission is scheduled for the at least one receiving radio equipment 720 in the subframe.

The at least one parameter may in some embodiments be pre-configured in the at least one receiving radio equipment 720. Alternatively or additionally, the control information may indicate the at least one parameter.

The at least one parameter may further comprise a presence parameter for enabling the at least one receiving radio equipment 720 to determine, based on the presence parameter, that the reference signal is present in the subframe. The presence parameter may then in one example be a position in a time-frequency resource grid of a control channel carrying scheduling information intended for the at least one receiving radio equipment 720. In this example the presence parameter serves to indicate that when the control channel is located on the position in the time-frequency grid, the reference signal is present in the subframe. The position may be a particular or pre-determined position in the time-frequency grid. In another example, the presence parameter may be scheduling information for the at least one receiving radio equipment 720 being present or comprised in the transmitted control information. In this example the presence parameter serves to indicate that when the control information comprises scheduling information for the at least one receiving radio equipment 720, the reference signal is present in the subframe. The scheduling information may in some embodiments be comprised in a DCI message in the control information.

In some embodiments, the at least one parameter may comprise one or more parameters that are explicitly signalled to the at least one receiving radio equipment 720 in the control information. The one or more parameters may in some embodiments be comprised in scheduling information, e.g. in a DCI message, in the control information. In one example, the at least one parameter may alternatively or additionally comprise an index indicating at least one of the one or more properties of the transmitted reference signal out of a pre-configured set of properties known to the at least one receiving radio equipment 720. The index may e.g. be one of the explicitly signalled one or more parameters. Alternatively or additionally, the at least one parameter may comprise one or more parameters that are implicitly signalled or indicated in the control information to the at least one receiving radio equipment 720 by being coupled to or dependent on one or more other parameters indicated in the control information. The one or more other parameters may in some embodiments be comprised in scheduling information, e.g. in a DCI message, in the control information.

The one or more other parameters indicated in the control information may include one or more parameters related to a data transmission scheduled for the at least one receiving radio equipment. The data transmission may be scheduled on a data channel and associated with scheduling information comprised in said control information. The one or more parameters related to the data transmission may be one or more of:
1) a modulation order and/or multiple input multiple output, MIMO, order used on the data channel,
2) a bandwidth of the data channel,
3) a position in a time-frequency resource grid of the data channel,
4) an identity of the at least one receiving radio equipment 720, and
5) an allocation of a control channel carrying the scheduling information.

The reference signal may in some embodiments be intended for use by the at least one receiving radio equipment 720 for obtaining a refined time synchronization needed for demodulation and/or decoding of a downlink signal associated with said control information. In such embodiments, the reference signal may be transmitted from an antenna port that is co-located or quasi co-located at least with respect to time with an antenna port used for transmitting the downlink signal. The reference signal may then further be intended for use by the at least one receiving radio equipment 720 for determining parameters used for computing a channel estimate that is to be used for demodulating and/or decoding the downlink signal associated with said control information. The downlink signal may for example be a data transmission scheduled for the at least one receiving radio equipment 720 in the subframe. Alternatively or additionally, the reference signal may be intended for use by the at least one receiving radio equipment 720 for obtaining a refined time synchronization needed for transmission of an uplink signal associated with said control information. The uplink signal may for example be a data transmission scheduled for the at least one receiving radio equipment 720 in a subsequent subframe. In further embodiments, the reference signal may alternatively or additionally be intended for use by the at least one receiving radio equipment 720 for measurements for positioning. The reference signal may for example serve as a timing reference for the positioning measurements. In yet further embodiments, the reference signal may alternatively or additionally be intended for use by the at least one receiving radio equipment 720 for power measurements.

Figure 12:
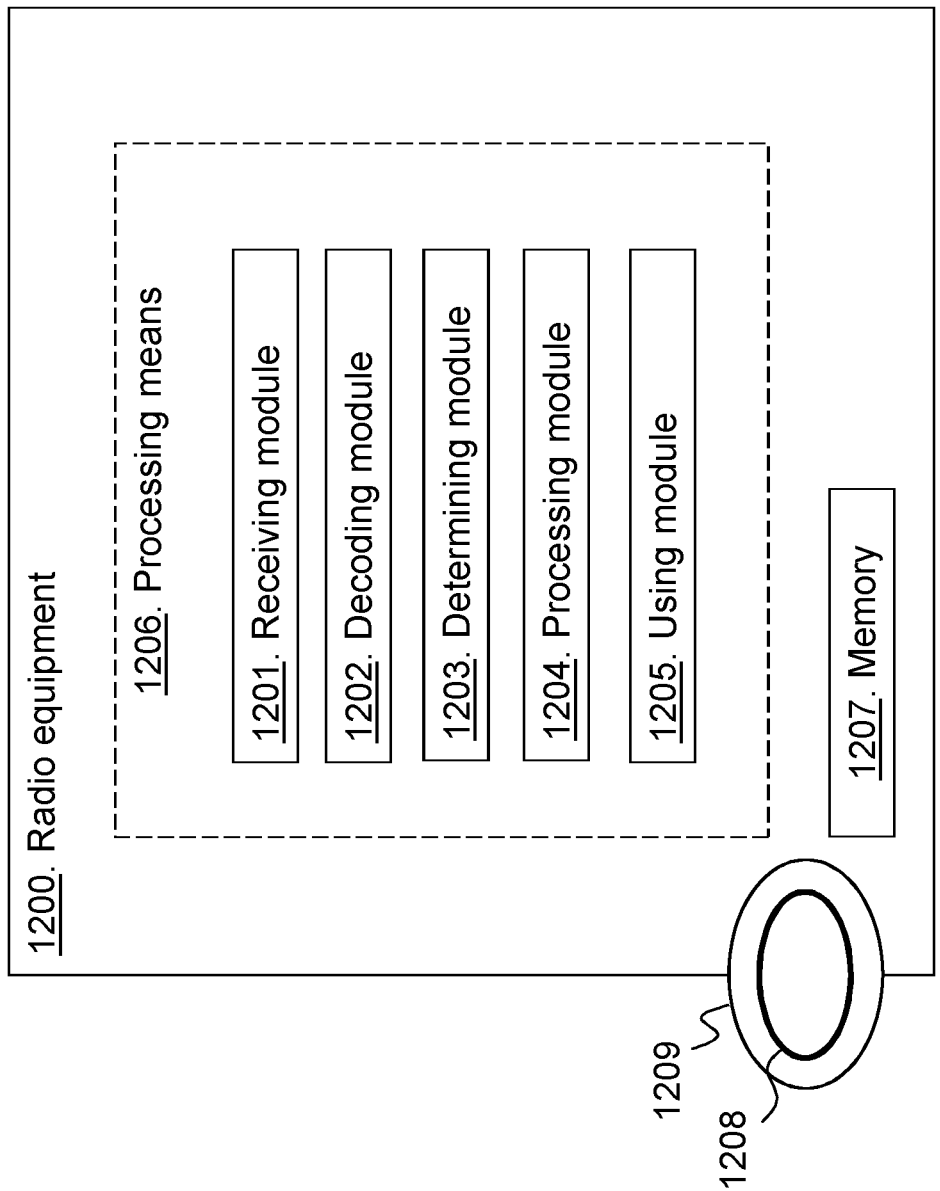
FIG. 12 is a block diagram illustrating a radio equipment for performing the procedure of a receiving radio equipment, according to further possible embodiments.

In order to perform the method described with reference to FIG. 9 above, a second radio equipment 1200, such as the receiving radio equipment 720, is provided. FIG. 12 is a block diagram depicting the second radio equipment 1200 for receiving a reference signal transmitted by a transmitting radio equipment 710 in a subframe where a portion of one or more multi-carrier modulation symbols that are comprised in the subframe is used for transmitting control information.

The second radio equipment 1200 is configured to, by comprising a receiving module 1201 being configured to, receive a transmission in the subframe. The transmission comprises the control information and the reference signal. The reference signal is overlaid or superimposed on at least a part of the portion of the one or more multi-carrier modulation symbols that is used for transmitting the control information.

The second radio equipment 1200 may optionally be configured to, by optionally comprising a decoding module 1202 being configured to, decode the received control information prior to determining one or more properties of the reference signal. The control information may need to be decoded prior to determining at least one of the one or more properties of the reference signal for embodiments where one or more parameters for determining the one or more properties of the reference signal are signalled in the control information.

The second radio equipment 1200 is further configured to, by comprising a determining module 1203 being configured to, determine the one or more properties of the reference signal based on at least one parameter.

The second radio equipment 1200 is further configured to, by comprising a processing module 1204 being configured to, process the reference signal using the determined one or more properties of the reference signal.

The second radio equipment 1200 may optionally be configured to, by optionally comprising a using module 1205 being configured to, use a result of said processing of the reference signal for performing processing of a data transmission scheduled for the second radio equipment 1200. The data transmission may be scheduled on a data channel and associated with scheduling information comprised in said control information.

The embodiments for receiving a reference signal transmitted by a transmitting radio equipment 710 in a subframe where a portion of one or more multi-carrier modulation symbols that are comprised in the subframe is used for transmitting control information may further be implemented through processing means 1206, for example one or more processors in the second radio equipment 1200 depicted in FIG. 12, e.g. together with computer program code, which processor or processing means 1206 is configured to perform the functions and/or method actions of the embodiments herein. The second radio equipment 1200 may further comprise a memory 1207. The memory 1207 may comprise one or more units to be used to store data on, such as pre-configured information, information on the at least one parameter and the one or more properties of the reference signal, control information such as scheduling information, applications to perform the methods disclosed herein when being executed, and similar.

The methods according to the embodiments described herein for the second radio equipment 1200 may be implemented by means of e.g. a computer program 1208 or a computer program product, comprising instructions, i.e., software code portions, which, when executed on at least one processor, cause the at least one processor to carry out the actions described herein, as performed by the second radio equipment 1200. The computer program 1208 may be stored on a computer-readable storage medium 1209, e.g. a disc or similar. The computer-readable storage medium 1209, having stored there on the computer program 1208, may comprise the instructions which, when executed on at least one processor, cause the at least one processor to carry out the actions described herein, as performed by the second radio equipment 1200. In some embodiments, the computer-readable storage medium 1209 may be a non-transitory computer-readable storage medium.

Figure 13:
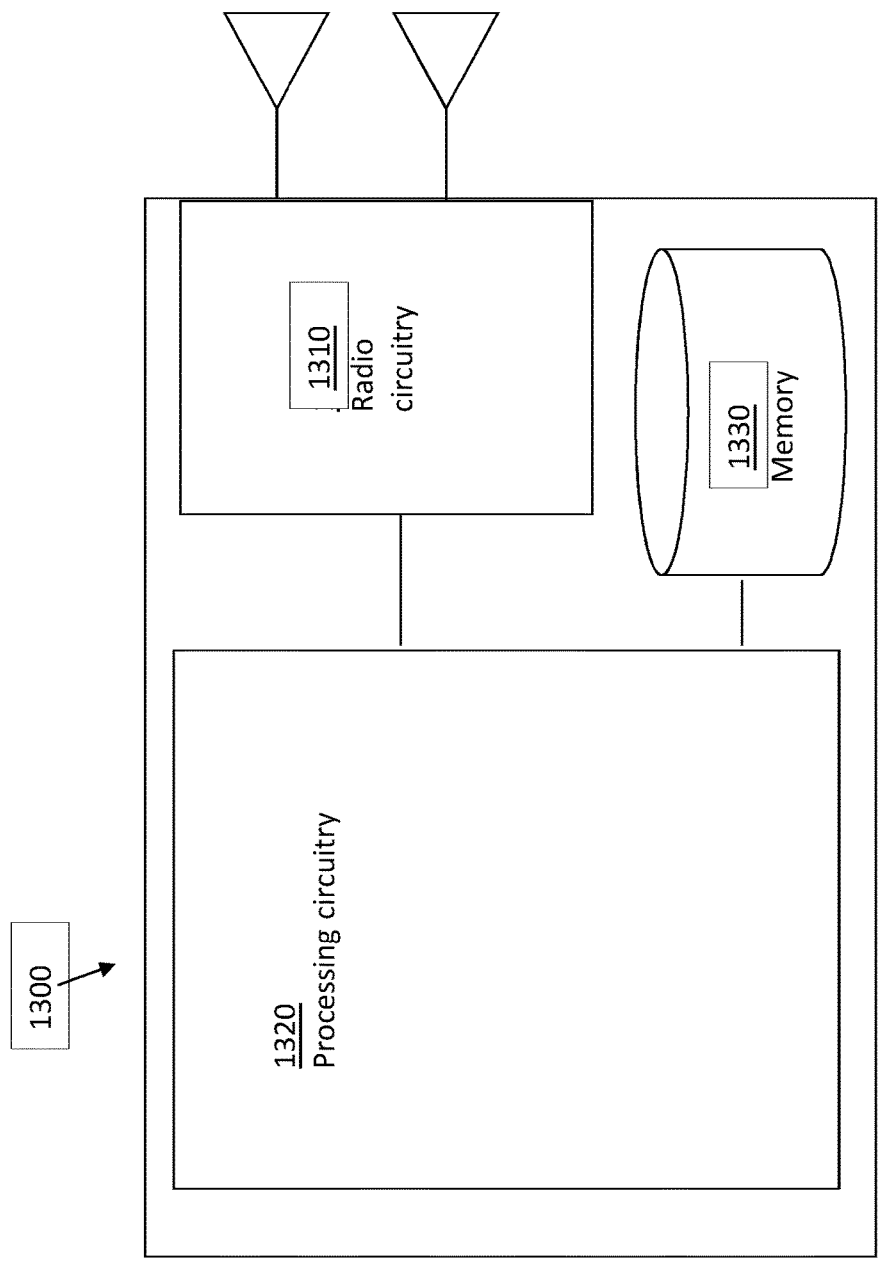
FIG. 13 is another block diagram illustrating a radio equipment for performing the procedure of a receiving radio equipment, according to further possible embodiments.

In an alternative implementation, in order to perform the method described with reference to FIG. 9 above a second radio equipment 1300, such as the receiving radio equipment 720, is provided. FIG. 13 is a block diagram depicting the second radio equipment 1300 for receiving a reference signal transmitted by a transmitting radio equipment 710 in a subframe where a portion of one or more multi-carrier modulation symbols that are comprised in the subframe is used for transmitting control information.

In this alternative embodiment, the second radio equipment 1300 comprises radio circuitry 1310 for wireless communication e.g. with the at least one transmitting radio equipment 710, processing circuitry 1320, and memory 1330. The second radio equipment 1300 is configured to, by the radio circuitry 1310 being configured to, receive a transmission in the subframe. The transmission comprises the control information and the reference signal. The reference signal is overlaid or superimposed on at least a part of the portion of the one or more multi-carrier modulation symbols that is used for transmitting the control information. The second radio equipment 1300 is further configured to, by the processing circuitry 1310 being configured to, determine one or more properties of the reference signal based on at least one parameter and to process the reference signal using the determined one or more properties of the reference signal.

The second radio equipment 1300 may further be configured to, by the processing circuitry 1310 being configured to, decode the received control information prior to determining the one or more properties of the reference signal. The control information may need to be decoded prior to determining at least one of the one or more properties of the reference signal for embodiments where one or more parameters for determining the one or more properties of the reference signal are signalled in the control information. The second radio equipment 1300 may in addition be configured to, by the processing circuitry 1310 being additionally configured to, use a result of said processing of the reference signal for performing processing of a data transmission scheduled for the second radio equipment 1300. The data transmission may be scheduled on a data channel and associated with scheduling information comprised in said control information.

The realization of the second radio equipment 1200 as described with reference to FIG. 12 and the alternative realization of the second radio equipment 1300 as described with reference to FIG. 13 may both encompass the following further particulars regarding the at least one parameter and regarding the reference signal, mentioned below for completeness but discussed in more detail with reference to FIG. 9 above, illustrating various embodiments of the method that may be performed by any one of the realizations of the second radio equipment 1200, 1300.

The reference signal may in some embodiments be a reference signal transmitted by the transmitting radio equipment 710 from an antenna port that is co-located or quasi co-located at least with respect to time with an antenna port used for transmitting the data transmission scheduled for the second radio equipment 1200, 1300 and associated with scheduling information comprised in said control information.

The at least one parameter may include one or more of the following parameters:
1) parameters determining a sequence used for the reference signal,
2) a bandwidth of the reference signal,
3) a position in a time-frequency resource grid of the reference signal,
4) sequence offset parameters for using only a part of the bandwidth of the reference signal,
5) a transmit power of the reference signal,
6) quasi co-location parameters, and
7) a data channel associated with the reference signal. The data channel may be a data channel upon which the data transmission is scheduled for the second radio equipment 1200, 1300 in the subframe.

The at least one parameter may in some embodiments be pre-configured in the second radio equipment 1200, 1300. In such embodiments, the second radio equipment 1200, 1300 being configured to determine the one or more properties of the reference signal based on the at least one parameter may comprise the second radio equipment 1200, 1300 being configured to, by the determining module 1203 or the processing circuitry 1320 being configured to, blindly decode the reference signal to determine the one or more properties based on the preconfigured at least one parameter. Alternatively or additionally, the at least one parameter may be indicated by the control information comprised in the received transmission.

Furthermore, the at least one parameter may in some embodiments comprise a presence parameter for indicating, as a presence property, whether or not the reference signal is present in the subframe. The second radio equipment 1200, 1300 being configured to determine the one or more properties of the reference signal based on the at least one parameter may then comprise the second radio equipment 1200, 1300 being configured to, by the determining module 1203 or the processing circuitry 1320 being configured to, determine based on the presence parameter that the reference signal is present in the subframe.

The presence parameter may then in one example be a position in a time-frequency resource grid of a control channel carrying scheduling information intended for the second radio equipment 1200, 1300. In this example the second radio equipment 1200, 1300 may then be configured to, by the determining module 1203 or the processing circuitry 1320 being configured to, determine that the reference signal is present in the subframe when the control channel is located on the position in the time-frequency grid. The position may be a particular or pre-determined position in the time-frequency grid.

In another example, the presence parameter may be scheduling information for the second radio equipment 1200, 1300 being present or comprised in the transmitted control information. In this example the second radio equipment 1200, 1300 may then be configured to, by the determining module 1203 or the processing circuitry 1320 being configured to, determine that the reference signal is present in the subframe when the control information comprises scheduling information for the second radio equipment 1200, 1300. The scheduling information may in some embodiments be comprised in a DCI message in the control information.

It was mentioned above that one or more parameters for determining the one or more properties of the reference signal may be signalled in the control information.

In some such embodiments, the at least one parameter may comprise one or more parameters that are indicated to the second radio equipment 1200, 1300 by being explicitly signalled to the second radio equipment 1200, 1300 in the control information. The one or more parameters may in some embodiments be comprised in scheduling information, e.g. in a DCI message, in the control information. The second radio equipment 1200, 1300 being configured to determine the one or more properties of the reference signal based on the at least one parameter may then comprise the second radio equipment 1200, 1300 being configured to, by the determining module 1203 or the processing circuitry 1320 being configured to, determine at least one of the one or more properties of the reference signal based on the explicitly signalled one or more parameters after that the control information has been decoded. In one example, the at least one parameter may alternatively or additionally comprise an index indicating at least one of the one or more properties of the reference signal out of a pre-configured set of properties known to the second radio equipment 1200, 1300. The index may e.g. be one of the explicitly signalled one or more parameters.

Alternatively or additionally, the at least one parameter may comprise one or more parameters that are implicitly signalled or indicated in the control information to the second radio equipment 1200, 1300 by being coupled to or dependent on one or more other parameters indicated in the control information. The one or more other parameters may in some embodiments be comprised in scheduling information, e.g. in a DCI message, in the control information. The second radio equipment 1200, 1300 being configured to determine the one or more properties of the reference signal based on the at least one parameter may then comprise the second radio equipment 1200, 1300 being configured to, by the determining module 1203 or the processing circuitry 1320 being configured to, determine at least one of the one or more properties of the reference signal based on the implicitly signalled one or more parameters after that the control information has been decoded. The one or more other parameters indicated in the control information may include one or more parameters related to a data transmission scheduled for the second radio equipment 1200, 1300. The data transmission may be scheduled on a data channel and associated with scheduling information comprised in said control information. The one or more parameters related to the data transmission may be one or more of:
1) a modulation order and/or multiple input multiple output, MIMO, order used on the data channel,
2) a bandwidth of the data channel,
3) a position in a time-frequency resource grid of the data channel,
4) an identity of the second radio equipment 1200, 1300, and
5) an allocation of a control channel carrying the scheduling information.

The data transmission on the data channel scheduled for the second radio equipment 1200, 1300 and associated with scheduling information comprised in said control information may in some embodiments comprise an uplink data transmission from the second radio equipment 1200, 1300 in another subframe, e.g. a subsequent subframe, for which the result of said processing of the reference signal is a refined time synchronization needed for the processing of the uplink data transmission at the second radio equipment 1200, 1300. The processing of the uplink data transmission may for example comprise determining a transmission time for the uplink data transmission.

Alternatively or additionally, the data transmission on the data channel scheduled for the second radio equipment 1200, 1300 and associated with scheduling information comprised in said control information may comprise a downlink data transmission to the second radio equipment 1200, 1300 in the subframe for which the result of said processing of the reference signal is a refined time synchronization needed for the processing of the downlink data transmission at the second radio equipment 1200, 1300. The processing of the downlink data transmission may for example comprise demodulation and/or decoding of the downlink data transmission. In the demodulation of the downlink data transmission a channel estimate, computed from parameters determined as a result of said processing of the reference signal, may be used.

The second radio equipment 1200, 1300 being configured to process the reference signal may in some embodiments comprise the second radio equipment 1200, 1300 being configured to, by the processing module 1204 or the processing circuitry 1320 being configured to, determine parameters used for computing the channel estimate. The second radio equipment 1200, 1300 being configured to use a result of said processing of the reference signal for performing processing of the data transmission scheduled on the data channel for the second radio equipment 1200, 1300 and associated with scheduling information comprised in the control information may in such embodiments comprise the second radio equipment 1200, 1300 being configured to, by the using module 1205 or the processing circuitry 1320 being configured to, use the computed channel estimate for demodulating the received downlink data transmission.

The second radio equipment 1200, 1300 being configured to process the reference signal may, alternatively or additionally, in further embodiments comprise the second radio equipment 1200, 1300 being configured to, by the processing module 1204 or the processing circuitry 1320 being configured to, use the reference signal for performing measurements for positioning. The processing may for example serve to obtain a timing reference for the positioning measurements.

In yet further embodiments, the second radio equipment 1200, 1300 being configured to process the reference signal may in further embodiments comprise the second radio equipment 1200, 1300 being configured to, by the processing module 1204 or the processing circuitry 1320 being configured to, use the reference signal for power measurements.

As will be readily understood by those familiar with communications design, functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio equipment such as any one of the transmitting or receiving radio equipment, for example.

Alternatively, several of the functional elements of the processor or processing means discussed may be provided through the use of dedicated hardware, while others are provided with hardware for executing software, in association with the appropriate software or firmware. Thus, the term processing circuitry or processor as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included.

Designers of devices and radio nodes will appreciate the cost, performance, and maintenance trade-offs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, performed by a transmitting radio equipment of a communications network, of transmitting a reference signal in a subframe where a portion of at least one multi-carrier modulation symbol that is comprised in the subframe is used for transmitting control information, the method comprising:
   transmitting the reference signal overlaid on at least a part of the portion of the at least one multi-carrier modulation symbol that is used for transmitting the control information in the subframe, the reference signal for use by at least one receiving radio equipment and the reference signal being generated based on at least one parameter that enables the at least one receiving radio equipment to determine at least one property of the transmitted reference signal.

2. A method, performed by a receiving radio equipment of a communications network, of receiving a reference signal transmitted by a transmitting radio equipment in a subframe where a portion of at least one multi-carrier modulation symbol that is comprised in the subframe is used for transmitting control information, the method comprising:
   receiving, in the subframe, a transmission comprising the control information and the reference signal, the reference signal being overlaid on at least a part of the portion of the at least one multi-carrier modulation symbol that is used for transmitting the control information;
   determining at least one property of the reference signal based on at least one parameter; and
   processing the reference signal using the determined at least one property of the reference signal.

3. A first radio equipment, for transmitting a reference signal in a subframe where a portion of at least one multi-carrier modulation symbol that is comprised in the subframe is used for transmitting control information, the first radio equipment comprising:
   processing circuitry configured to:
      cause transmission of the reference signal overlaid on at least a part of the portion of the at least one more multi-carrier modulation symbol that is used for transmitting the control information in the subframe, the reference signal for use by at least one receiving radio equipment and the reference signal being generated based on at least one parameter that enables the at least one receiving radio equipment to determine at least one property of the transmitted reference signal.

4. The first radio equipment according to claim 3, wherein the at least one parameter is pre-configured in the at least one receiving radio equipment.

5. The first radio equipment according to claim 3, wherein the at least one parameter is indicated by the control information.

6. The first radio equipment according to claim 3, wherein the at least one parameter comprises a presence parameter for enabling the at least one receiving radio equipment to determine, based on the presence parameter, that the reference signal is present in the subframe.

7. The first radio equipment according to claim 3, wherein the at least one parameter comprises at least one parameter that is explicitly signalled to the at least one receiving radio equipment in the control information.

8. The first radio equipment according to claim 3, wherein the at least one parameter comprises an index indicating at least one of the at least one property of the transmitted reference signal out of a pre-configured set of properties known to the at least one receiving radio equipment.

9. The first radio equipment according to claim 3, wherein the at least one parameter comprises at least one parameter that is implicitly signalled to the at least one receiving radio equipment by being coupled to at least one other parameter indicated in the control information.

10. The first radio equipment according to claim 3, wherein the at least one parameter includes at least one of the following parameters:
   1) parameters determining a sequence used for the reference signal;
   2) a bandwidth of the reference signal;
   3) a position in a time-frequency resource grid of the reference signal;
   4) sequence offset parameters for using only a part of the bandwidth of the reference signal;
   5) a transmit power of the reference signal;
   6) quasi co-location parameters; and
   7) a data channel associated with the reference signal.

11. The first radio equipment according to claim 3, wherein the processing circuitry is configured to cause transmission of the reference signal from an antenna port that is quasi co-located at least with respect to time with an antenna port used for transmitting a downlink signal associated with the control information.

12. A second radio equipment for receiving a reference signal transmitted by a transmitting radio equipment in a subframe where a portion of at least one multi-carrier modulation symbol that is comprised in the subframe is used for transmitting control information, the second radio equipment comprising:
   processing circuitry configured to:
      receive, in the subframe, a transmission comprising the control information and the reference signal, the reference signal being overlaid on at least a part of the portion of the at least one multi-carrier modulation symbol that is used for transmitting the control information;
      determine at least one property of the reference signal based on at least one parameter; and
      process the reference signal using the determined at least one property of the reference signal.

13. The second radio equipment according to claim 12, wherein the at least one parameter is pre-configured in the processing circuitry and wherein the processing circuitry is further configured to blindly decode the reference signal to determine the at least one property based on the preconfigured at least one parameter.

14. The second radio equipment according to claim 12, wherein the at least one parameter is indicated by the control information comprised in the received transmission.

15. The second radio equipment according to claim 12, wherein the at least one parameter comprises a presence parameter and wherein the processing circuitry is further configured to determine, based on the presence parameter, that the reference signal is present in the subframe.

16. The second radio equipment according to claim 12, wherein the reference signal is transmitted by the transmitting radio equipment from an antenna port that is quasi co-located at least with respect to time with an antenna port used for transmitting a data transmission scheduled for the second radio equipment and associated with scheduling information comprised in the control information.

17. The second radio equipment according to claim 12, wherein the processing circuitry is further configured to:
  use a result of the processing of the reference signal for performing processing of a data transmission scheduled on a data channel for the second radio equipment and associated with scheduling information comprised in the control information.

18. The second radio equipment according to claim 12, wherein the at least one parameter includes at least one of the following parameters:

1) parameters determining a sequence used for the reference signal;
2) a bandwidth of the reference signal;
3) a position in a time-frequency resource grid of the reference signal;
4) sequence offset parameters for using only a part of the bandwidth of the reference signal;
5) a transmit power of the reference signal;
6) quasi co-location parameters; and
7) a data channel associated with the reference signal.

19. The second radio equipment according to claim 12, wherein the processing circuitry being configured to process the reference signal comprises the processing circuitry being configured to determine parameters used for computing a channel estimate.

20. The second radio equipment according to claim 12, wherein the processing circuitry being configured to process the reference signal comprises the processing circuitry being configured to use the reference signal for performing measurements for positioning.

21. The second radio equipment according to claim 12, wherein the processing circuitry being configured to process the reference signal further comprises the processing circuitry being configured to use the reference signal for power measurements.

* * * * *